United States Patent
Ishii et al.

(10) Patent No.: US 6,565,004 B2
(45) Date of Patent: May 20, 2003

(54) OPTICAL DEVICE TO COLLECTIVELY READ A PLURALITY OF BAR CODES AND/ OR A PLURALITY OF OPTICAL READABLE SYMBOLS

(75) Inventors: Mitsuharu Ishii, Kawasaki (JP); Toshitaka Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/766,657

(22) Filed: Jan. 23, 2001

(65) Prior Publication Data

US 2002/0008141 A1 Jan. 24, 2002

(30) Foreign Application Priority Data

Jul. 21, 2000  (JP) ........................ 2000-220662

(51) Int. Cl.[7] .......................... G02B 26/10; G06K 7/10; G06K 9/22; G06K 19/06
(52) U.S. Cl. ............................ 235/462.25; 235/462.17; 235/462.24; 235/462.11
(58) Field of Search ................. 235/462.25, 462.05, 235/462.07, 462.08, 462.1, 462.14, 462.17, 462.22

(56) References Cited

U.S. PATENT DOCUMENTS

| | | | | |
|---|---|---|---|---|
| 5,235,172 A | * | 8/1993 | Oehlmann ................... 235/494 |
| 5,237,162 A | * | 8/1993 | Collins et al. .......... 235/462.25 |
| 5,237,163 A | | 8/1993 | Collins, Jr. et al. .......... 235/472 |
| 5,262,625 A | * | 11/1993 | Tom et al. .............. 235/462.07 |
| 5,296,691 A | * | 3/1994 | Waldron et al. ....... 235/462.12 |
| 5,436,439 A | * | 7/1995 | Nishimura et al. .......... 235/440 |
| 5,780,831 A | * | 7/1998 | Seo et al. ............... 235/462.07 |
| 5,988,507 A | * | 11/1999 | Ikeda et al. ............. 235/462.25 |
| 6,032,861 A | * | 3/2000 | Lemelson et al. ........... 235/456 |
| 6,155,490 A | * | 12/2000 | Ackley ................... 235/462.36 |
| 6,193,161 B1 | * | 2/2001 | Sojka et al. ........... 235/462.46 |
| 6,206,286 B1 | * | 3/2001 | Watanabe et al. ............ 235/383 |

FOREIGN PATENT DOCUMENTS

EP          000896290 A2  *  2/1999

OTHER PUBLICATIONS

Patent Abstract of Japan, Publication No. 10–302021 dated Nov. 13, 1998.

* cited by examiner

Primary Examiner—Michael G. Lee
Assistant Examiner—Daniel Walsh
(74) Attorney, Agent, or Firm—Armstrong Westerman & Hattori, LLP

(57) ABSTRACT

A scanning apparatus and an optical reading apparatus according to the invention is featured in obtaining reading result corresponding to a plurality of bar code symbols by processing, as predetermined, demodulated data corresponding to signal light from the bar code labels and optically readable symbols. Such a scanning apparatus extracts sets of consecutive data, which consecutively indicate all bar code symbols constituting the bar code symbols, from the demodulated data, and further chooses only sets of consecutive data that are different from each other, whereby reading data corresponding to a plurality of bar code symbols are collectively obtained. Furthermore, the optical reading apparatus collectively obtains the reading result corresponding to a plurality of symbols by extracting data that meets predetermined conditions and are different from each other, from the data obtained by demodulation.

21 Claims, 20 Drawing Sheets

Fig. 13
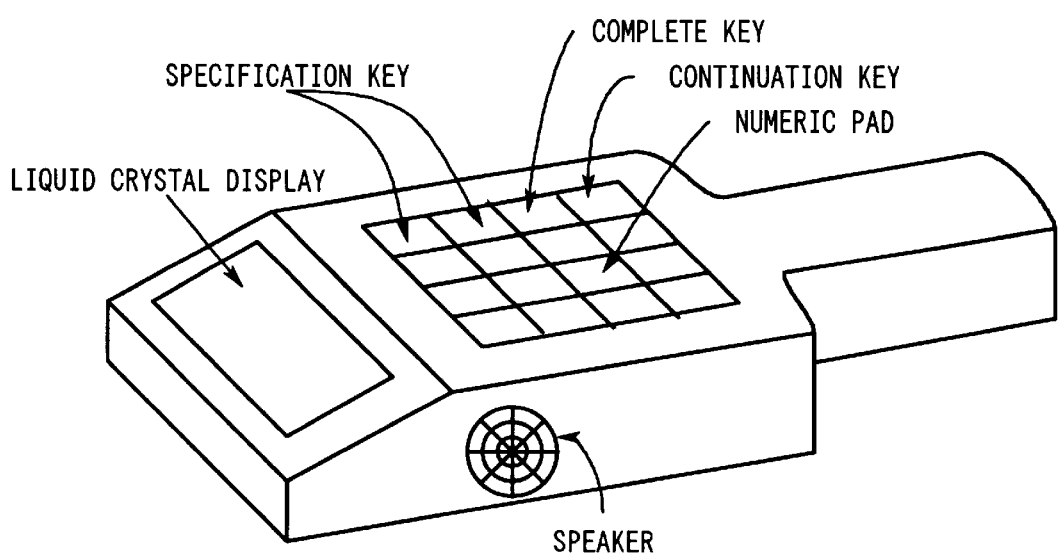
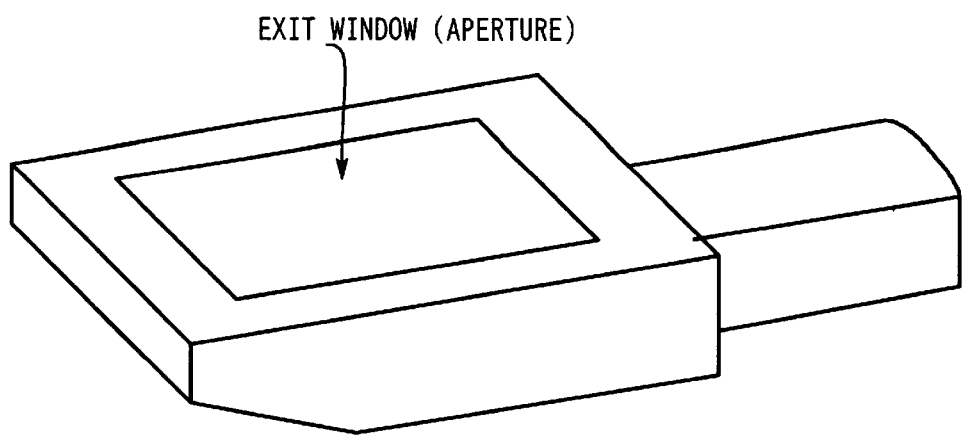

Fig. 17
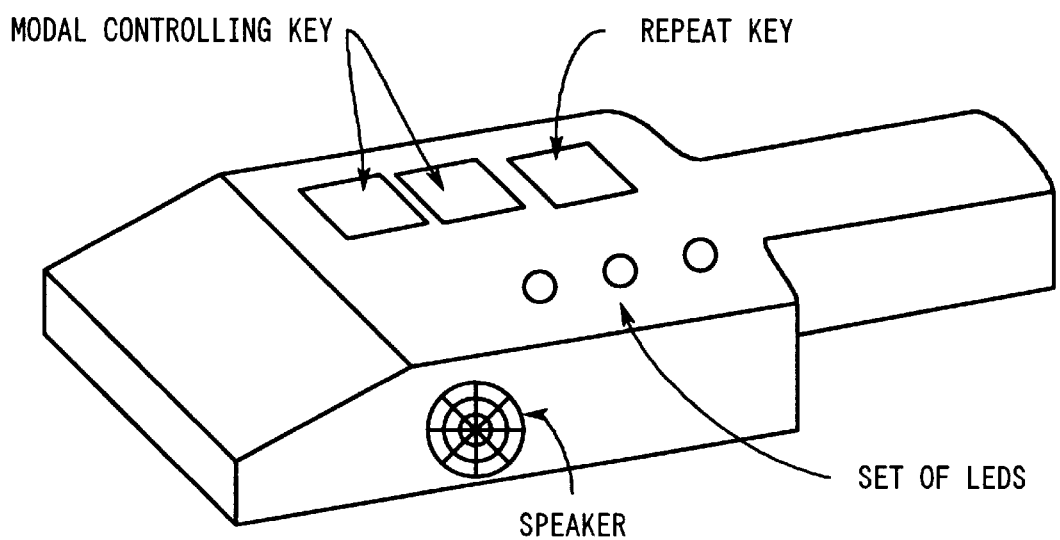
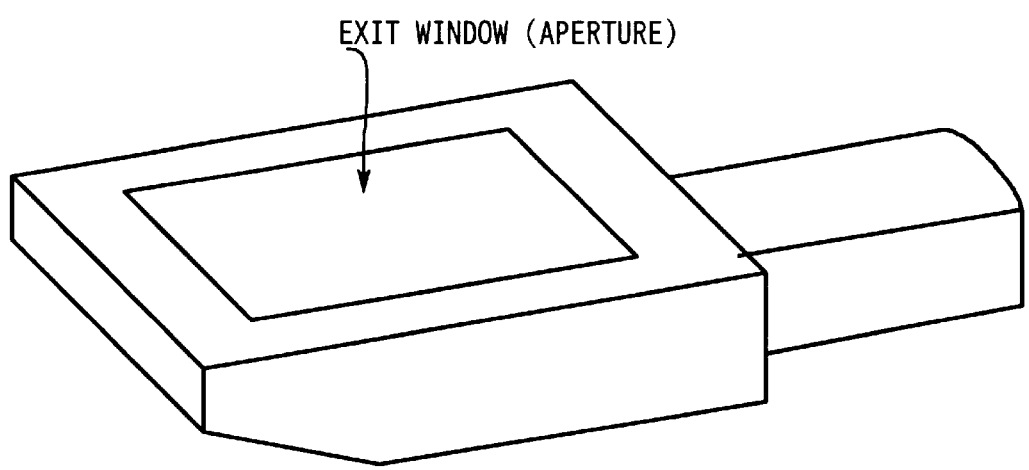

OPTICAL DEVICE TO COLLECTIVELY READ A PLURALITY OF BAR CODES AND/OR A PLURALITY OF OPTICAL READABLE SYMBOLS

BACKGROUND OF THE INVENTION

1. Field of the Invention

The present invention generally relates to an optical reading apparatus having an optical scanner for scanning information on objects, and more particularly to a bar code scanner that collectively reads bar codes existing in a scanning field of a laser beam by scanning a laser beam in a plurality of directions.

2. Description of the Related Art

There are roughly two types of bar code scanners. One is a bar code scanner that reads bar code symbol by bringing its reading part in contact with a bar code label or bringing the reading part very close to the bar code label. For example, a CCD touch scanner and pen scanner, etc., that are frequently used in small-sized retail stores belong to this type.

On the other hand, the fixed laser scanner and hand laser scanner can read bar code labels in a scanning field having a predetermined spatial spread by scanning a laser beam in various directions.

The CCD touch scanner and pen scanner described above have limits to the positional relationship between the reading part thereof and a bar code label of an object to be read. Therefore, only a single bar code can be read by one reading operation.

On the other hand, although a fixed laser scanner and a hand-held laser scanner have, respectively, predetermined reading depths, only a single bar code can be read by a single scanning operation in prior arts.

The reason resides in that a strict limitation is implied in terms of the time required for a reading process in major uses of this type of bar code scanner. Fixed laser scanners are mainly installed in a cash register in large-scaled retail stores. In such a use, a bar code symbol must be read at the instant when the bar code label crosses the reading field of a bar code scanner as the operator moves an article across it.

FIG. 19 shows a configurational example of a prior art fixed laser scanner. Also, FIG. 20 is a view explaining a reading action made by a prior art fixed laser scanner.

A laser beam is scanned in various directions by an optical system 401. When a bar code label is scanned by the laser beam, light diffused by the bar code label is incident into a photo acceptance unit 403, and is converted to electric signals corresponding to the intensity thereof, where the electric signals are inputted to a signal processing part 404. As shown in FIG. 20(*a*), the signal processing part 404 removes noise by binarizing the inputted electric signals in compliance with a predetermined slicing level. Also, a demodulating part 405 shown in FIG. 19 analyzes the pulse width and pulse interval of binarized signals obtained by the signal processing part 404, and generates reading data corresponding to the bar code symbol recorded in the bar code label described above on the basis of the results of analysis. Then, the demodulating part 405 outputs the reading data to the host computer 407 via an interface part 406.

In order to read bar code symbols at a high efficiency by effectively utilizing the binarized signals obtained in a limited time, the demodulating part 405 employs a block data composite process and a label stitching method, etc.

The block data composite process is a technique for generating binarized signals corresponding to the entire bar code symbol by combining, as shown in FIG. 20(*b*), binarized signals obtained by scanning a range including half a block from a guard bar to a center bar and binarized signals obtained by scanning a range including the other half of the block from the center bar to the other guard bar.

Also, the label stitching method is a technique for generating binarized signals corresponding to the entire bar code symbol by detecting the respective binarized signals obtained in further detailed ranges, and the overlapped portion of these binarized signals and by combining these.

By employing these techniques, then, regardless of the alignment of articles when an operator moves the articles in the reading field of a bar code scanner, the bar code symbol can be read at high accuracy on the basis of the binarized signals obtained in a short period of time during which the articles cross the reading field of the bar code scanner.

The above-described block data composite process and label stitching method are based on the assumption that, in any case thereof, binarized signals inputted within the time corresponding to one reading operation is generated by diffusely reflected light from a single bar code label.

In uses in which these techniques are requisite and indispensable, this is the basis that the number of bar codes read by one reading operation by a fixed laser scanner is limited to a single bar code symbol.

However, recently, laser scanners are being developed and downsized to hand-held laser scanners. In line therewith, there is a possibility that the above-described hand-held laser scanners can be utilized in uses where a touch scanner and a pen scanner have conventionally been used.

SUMMARY OF THE INVENTION

It is therefore an object of the invention to provide an optical reading apparatus capable of collectively reading a plurality of optically readable codes resting in a field scanned by a laser beam.

It is a further object of the invention to greatly reduce the work load applied to an operator of an optical reading apparatus represented by a scanning apparatus, by collectively reading a plurality of different bar code labels indicating various symbols resting in a limited field on, for example, a checkout counter.

The above-described objects are achieved by a first scanning apparatus comprising: a discriminating part that discriminates and extracts a set of consecutive data which meet predetermined conditions among candidates obtained by a signal converting part; a choosing part for choosing a set of consecutive data different from each other from a group of the sets of consecutive data; and an outputting part for outputting reading result in response to the input of chosen set of consecutive data.

The first scanning apparatus like this is capable of extracting a set of consecutive data that consecutively expresses all modules constituting bar code symbols, by inputting candidates obtained by converting electric signals, which are obtained by a photoelectric converting part, into the discriminating part by a signal converting part.

Only sets of consecutive data that are different from each other are chosen from a group of the sets of extracted consecutive data by the choosing part, and the sets of consecutive data overlapped due to the same bar code symbols having been scanned two or more times are excluded, wherein by outputting the remaining sets of consecutive data via an outputting part, the plurality of bar code labels described above can be collectively read, and the reading result corresponding thereto can be outputted.

Also, the above-described objects can be achieved by a first optical reading apparatus that is provided with: a scanning part that generates a scanning laser beam capable of scanning optically readable symbols by scanning a laser beam; a transducer that receives light reflected from the symbol and generates electric signals corresponding to the amount of the received light; a demodulating part that demodulates the electric signals outputted from the transducer and reproduces data recorded as the symbol; a discriminating part for extracting sets of data that are different from each other among the data demodulated by the demodulating part; a numeric inputting part that receives numeric data; and a comparing part for comparing the numeric data inputted from the numeric inputting part with the number of sets of data extracted by the discriminating part.

The first optical reading apparatus as described above is capable of collectively reading these symbols according to the electric signals obtained when scanning a plurality of symbols by a scanning laser beam.

By an optical reading apparatus as such, which can discriminate demodulated data that are different from each other among the demodulated data obtained when a scanning laser beam has scanned a plurality of optically readable symbols, it is possible to read these symbols at one time.

In addition, the above-described objects are achieved by a scanning apparatus provided with: a data inputting part that inputs data regarding the bar code labels which are objects to be read; and an editing part that edits the reading result according to of the data and the sets of consecutive data chosen by the choosing part.

Such a scanning apparatus is capable of obtaining a reading result consisting of bar code symbols corresponding to all the bar code labels which are the objects to be read, by the editing part duplicating the bar code symbols, and editing the reading result corresponding to an adequate set of consecutive data according to the data received by the data inputting part.

That is, since it is possible to securely generate the reading result corresponding to all the bar code labels of the object to be read, by editing the reading result according to the chosen sets of consecutive data and information upon receiving input of the information intuitively grasped by an operator, it is possible to further reduce the work load of the operator.

Further, the above-described objects are achieved by a scanning apparatus provided with an outputting part comprising: a reporting part for reporting a reading result on the reading result generated by the editing part; and a transmission controlling part that transmits the reading result in response to input of an instruction of approving the reading result.

Since such a scanning apparatus presents the result of having collectively read a plurality of bar code labels to an operator and can transmit the reading result to the host computer upon the approval of the reading result, it is possible to prevent erroneous reading result from being transmitted.

Also, the above-described objects are achieved by a scanning apparatus provided with: a total number inputting part that inputs the total number of bar code labels which are objects to be read; a judging part that judges, according to the total number of bar code labels and the number of the chosen sets of consecutive data, whether or not the reading operation is completed; and an output controlling part that instructs to the choosing part that the chosen sets of consecutive data are transferred to the outputting part, in response to the result of judgement.

Since such a scanning apparatus can receive by the total number inputting part the input of the total number of objects to be read, which is intuitively grasped by an operator, it is possible to collectively read a plurality of bar code labels automatically without any excess or shortage, according to the total number of objects to be read, by automatically judging the completion of a reading operation in cases where the objects to be read differ from each other.

Also, the above-described objects are achieved by a scanning apparatus having the total number inputting part combined by being provided with an operation mechanism for inputting data, and a first generating part that generates data indicating the number in response to an operation of the operation mechanism.

In such a scanning apparatus, the total number of bar code labels which are intuitively grasped by an operator is inputted by a simple operation and is provided for the completion judgement of the reading operation.

In addition, the above-described objects are achieved by a scanning apparatus having the total number inputting part combined by being provided with a detecting part for extracting a candidate corresponding to the bar code symbol indicating the number; and second generating part that generates data indicating the number according to the candidate. In such a scanning apparatus, an adequate number can be inputted by utilizing a function inherent to the scanning apparatus, whereby it becomes unnecessary to newly add additional hardware components to input the number.

The above-described objects are achieved by a scanning apparatus provided with: a total number inputting part that inputs the total number of bar code labels which are objects to be read; a judging part that judges whether or not a reading operation is completed on the basis of the total number of bar code labels and the number of the chosen sets of consecutive data; and a notifying part that notifies information to support the reading operation in response to the judgement result.

Such a scanning apparatus receives the input of the total number of objects to be read, which is intuitively grasped by an operator, automatically judges, based on the total number of the objects to be read, whether or not a reading operation is completed, and notifies the operator of information corresponding to the judgement result, and the scanner can thereby support the operator in charge of reading operations.

The above-described objects are achieved by a scanning apparatus provided with a notifying part having an indicating part that displays messages or the like in response to the judgement result. Since such a scanning apparatus can display messages or adequate images showing whether or not the reading operation is completed, it is possible to support the reading operation by more intuitively grasped information.

The above-described objects are achieved by a scanning apparatus provided with a notifying part having an audio outputting part that outputs sound responsive to the judgement result. According to such a scanning apparatus, since it is possible to output a confirmation sound showing that the reading operation has been successfully completed, and an alarm sound showing that the reading operation is continuing, it is possible to support a reading operation by information that can be more intuitively grasped.

The above-described objects are achieved by a scanning apparatus provided with a reporting part that reports the progress of a reading operation of bar code labels.

In such a scanning apparatus, since information regarding these sets of consecutive data is prepared by the reporting part according to the sets of consecutive data chosen by the choosing part and is provided to an operator, it is possible to facilitate the grasping of an operator of the progress status of the reading operation.

The above-described objects are achieved by a scanning apparatus provided with: a modal inputting part that inputs a modal instruction; a verifying part that verifies correctness of the sets of consecutive data chosen by the choosing part; and a transfer controlling part that controls a transfer action from the choosing part to the outputting part in response to the verification result.

In such scanning apparatus, it is possible to verify the correctness of a set of consecutive data that are repeatedly extracted by the discriminating part by mutually comparing the sets of consecutive data when a specified reading mode is inputted by the modal inputting art, based on the fact that in the case a plurality of bar code labels having the same bar code symbols are object to be read, the same sets of consecutive data repeatedly extracted by the discriminating part. And, the transfer controlling part can control whether or not these sets of consecutive data are transferred to the outputting part.

The above-described objects are achieved by a scanning apparatus provided with a modal inputting part that inputs a modal instruction, and an outputting part combined by being provided with an output controlling part that instructs output of the reading result responsive to a predetermined operation and an sending part that outputs the reading result corresponding to the sets of consecutive data chosen by the choosing part whenever an instruction is inputted from the output controlling part. Such a scanning apparatus can repeatedly output the reading result corresponding to the chosen sets of consecutive data by the number of times by which instructions are inputted by the output controlling part when a specified mode is inputted by the modal inputting part.

The above-described objects are achieved by an optical reading apparatus provided with a discriminating part having a selecting part that selects sets of data expressing optically readable symbols from the top to the end thereof without any interruption. Such an optical reading apparatus ensures the correctness of the sets of data extracted by the discriminating part.

In addition, the above-described objects are achieved by an optical reading apparatus equipped with an indicating part that indicates sets of data extracted by the discriminating part. Such an optical reading apparatus provides an operator with information regarding the progress status of reading operations and can support the reading operations.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 13 is a view showing one example of the appearance of a bar code scanner;

FIG. 17 is a view showing another example of the appearance of a bar code scanner;

DESCRIPTION OF THE PREFERRED EMBODIMENTS

[Principle]

First, a description is given of the principle of a bar code scanner having applied a scanning apparatus according to the present invention.

Figure 1:
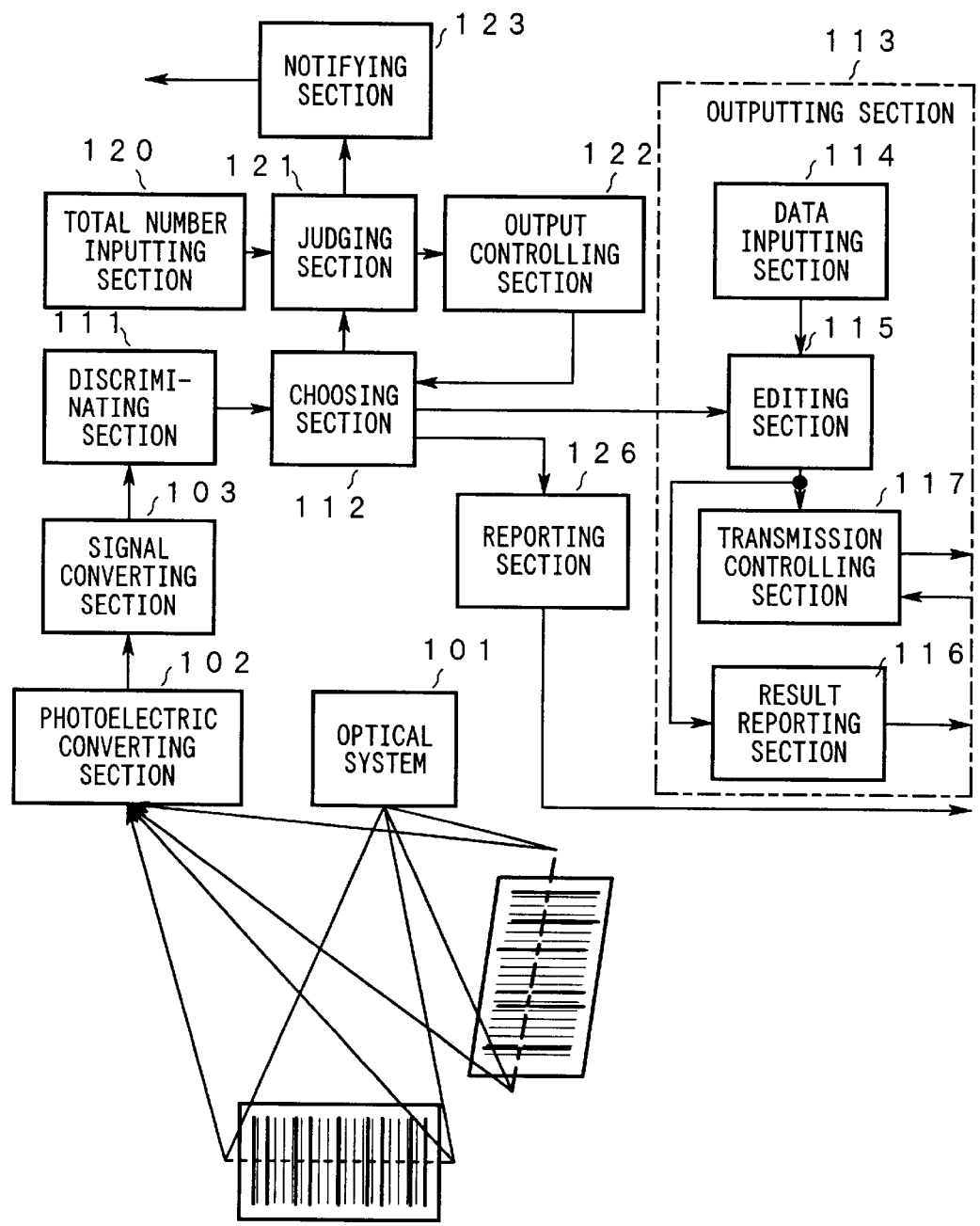
FIG. 1 is a view showing the principle of the first through fifth, and tenth bar code scanners having applied scanning apparatuses according to the invention.

FIG. 1 shows the principle of the first through fifth, and tenth bar code scanner having applied a scanning apparatus according to the invention.

The first bar code scanner shown in FIG. 1 is composed of a discriminating section 111, a choosing section 112, and an outputting section 113 in addition to an optical system 101, a photoelectric converting device 102, and a signal converting section 103.

The principle of the first bar code scanner having applied a scanning apparatus according to the invention is as follows;

The optical system 101 scans predetermined fields, or spans, in a plurality of directions by using a laser beam. The photoelectric converting device 102 converts diffusely reflected light into electric signals corresponding to the intensity of said reflected light by an object existing in the field scanned by the laser beam of an optical system. The signal converting section 103 converts electric signals corresponding to the diffusely reflected lights made by at least a part of the bar codes described on at least one bar code label existing in the scanning field of the laser beam into candidates with a predetermined format of upon receiving the electric signals. The discriminating section 111 extracts sets of consecutive data, which meets predetermined conditions, from the candidates obtained by the signal converting section 103. The choosing section 112 chooses sets of consecutive data of types different from each other from the group of sets of consecutive data, and the outputting section 113 outputs reading result in response to the choosing of the sets of consecutive data.

The first bar code scanner constructed as described above functions as follows;

Since the signal converting section 103 converts the electric signals outputted by the photoelectric converting device 102, candidates corresponding to the diffusely reflected light are obtained from bar code labels which rest in the field scanned by the laser beam of the optical system 101. By extracting data (hereinafter called "a set of consecutive data"), which continuously express all the modules constituting a bar code symbol, from these candidates by the discriminating section 111, it is possible to completely obtain information contained in the bar code symbol indicated on a bar code label which is one of an object to be read. A group of sets of consecutive data thus obtained includes overlapped sets of consecutive data produced by the same bar code symbol being scanned two or more times, and such overlapped sets of consecutive data are excluded by choosing only sets of consecutive data that are different from each other by the choosing section 112, wherein the outputting section 113 collectively outputs the reading result corresponding to the thus chosen sets of consecutive data as the reading result corresponding to the plurality of bar code symbols described above.

The second bar scanner shown in FIG. 1 is constructed so that, in the above-described first bar code scanner, the outputting section 113 is further provided with a data inputting part 114 and an editing part 115.

The principle of the second bar code scanner having applied a scanning apparatus according to the invention is as follows;

The data inputting part 114 inputs the number of the bar code labels having the same bar code symbols and information indicating which bar code symbols included in the set of bar code labels which are objects to be read. The editing part 115 duplicates a set of consecutive data corresponding to the bar code symbols included in the group chosen sets of consecutive data, and edits the reading result corresponding to all the bar code symbols included in the group of bar code labels which are objects to be read.

The second bar code scanner thus constructed functions as follows;

Since the editing part 115 duplicates data corresponding to adequate sets of consecutive data on the basis of the data inputted by the data inputting part 114, it is possible to obtain the reading result including the items corresponding to all the bar code labels of the object to be read.

The third bar code scanner shown in FIG. 1 is constructed so that, in the first bar code scanner described above, the outputting section 113 is further provided with a data inputting part 114, an editing part 115, a result reporting part 116, and a transmission controlling part 117.

The principle of the third bar code scanner having applied a scanning apparatus according to the invention is as follows;

The data inputting part 114 inputs the number of the bar code labels having the same bar code symbols and information indicating which bar code symbols in a set of bar code labels of an object to be read. The editing part 115 duplicates the corresponding sets of consecutive data included in the bar code symbols of the chosen sets of consecutive data on the basis of the data pertaining to the inputted bar code label, and edits the reading result corresponding to all the bar code symbols included in the set of bar code labels of an object to be read. The result reporting part 116 reports the reading result on the basis of the reading result generated by the editing part 115. The transmission controlling part 117 transmits the reading result in response to the input of an instruction approving the reading result.

The third bar code scanner thus constructed functions as follows;

The result reporting part 116 proposes the result of having collectively read a plurality of bar code labels to an operator, in which the result includes all the items obtained by editing, and transmits the reading result to the host computer via the transmission controlling part 117 after receiving approval of the reading result.

The fourth bar code scanner shown in FIG. 1 is constructed so that the first bar code scanner described above is further provided with a total number inputting section 120, a judging section 121, and an output controlling section 122.

The principle of the fourth bar code scanner having applied a scanning apparatus according to the invention functions as follows;

The total number inputting section 120 inputs the total number of bar code labels which are object to be read. The judging section 121 judges, based on the total number of bar code labels and the number of the chosen sets of consecutive data, whether or not a reading operation is completed. The output controlling section 122 instructs transfer of the sets of consecutive data chosen by choosing section 112 to the outputting section 113, in response to the judgement result.

The fourth bar code scanner thus constructed functions as follows;

Based on the total number of bar code labels inputted by the total number inputting section 120 and the number of the chosen sets of consecutive data, the judging section 121 judges whether or not the reading operation is completed. According to the judgement result, the output controlling section 122 controls output of the sets of consecutive data from the choosing section 112 to the outputting section 113.

The fifth bar code scanner shown in FIG. 1 is constructed so that the first bar code scanner described above is further provided with a total number inputting section 120, a judging section 121, and a notifying section 123.

The principle of the fifth bar code scanner having applied a scanning apparatus according to the invention is as follows;

The total number inputting section 120 inputs the total number of bar code labels which are objects to be read. Based on the total number inputted by the total number inputting section 120 and the number of the chosen sets of consecutive data, the judging section 121 judges whether or not the reading operation has been completed with respect to the bar code labels of an object to be read. The notifying section 123 notifies an operator of information to support the reading operation in response to the judgement result made by the judging section 121.

The fifth bar code scanner thus constructed functions as follows;

Based on the total number of bar code labels inputted by the total number inputting section 120 and the number of the chosen sets of consecutive data, the judging section 121 judges whether or not the reading operation has been completed. According to the judgement result, the notifying section 123 notifies an operator of information to support the reading operation.

Hereinafter, a description is given of the principle of the sixth and seven bar code scanners having applied scanning apparatuses according to the invention with reference to FIG. 3.

Figure 3:
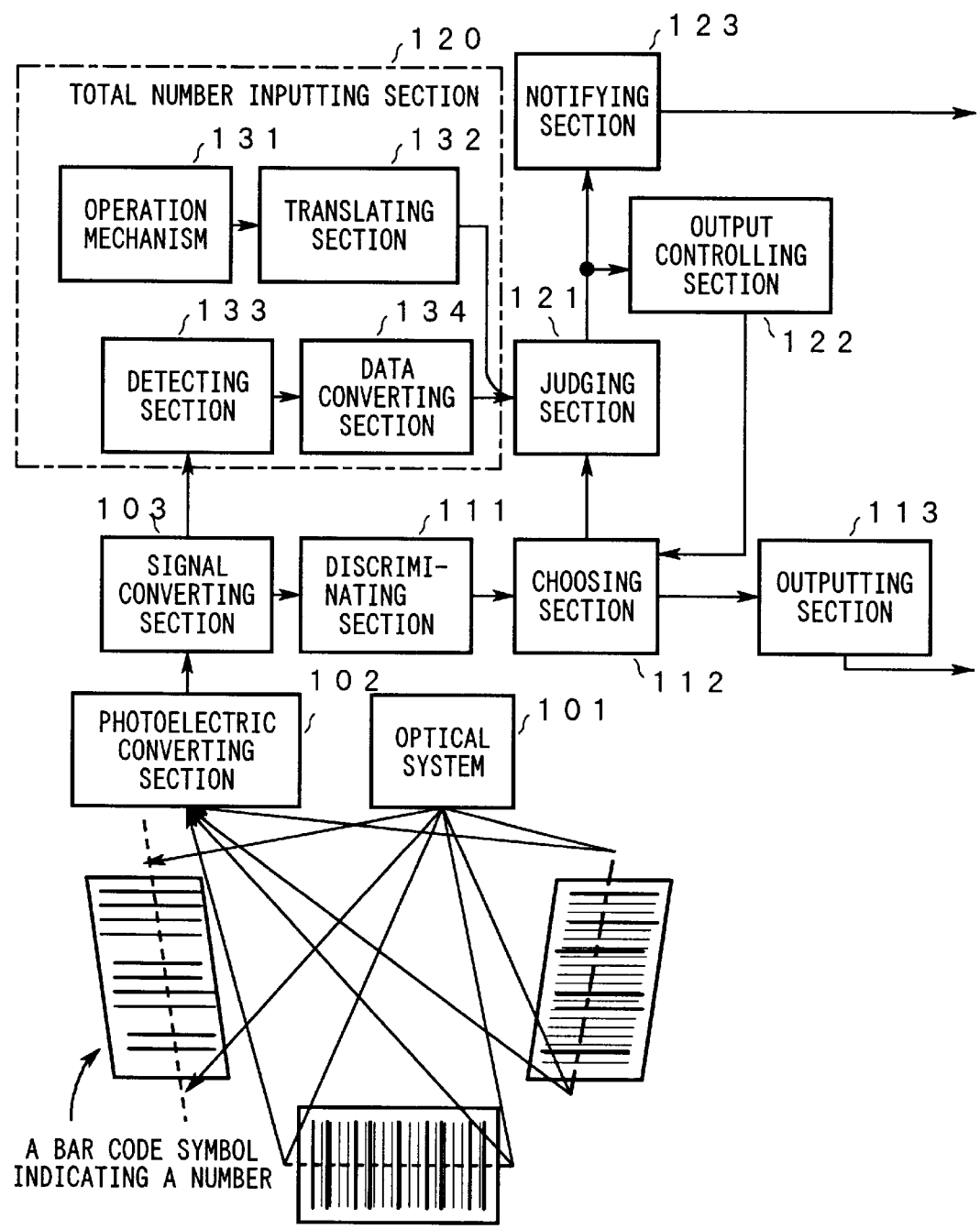
FIG. 3 is a view showing the principle of the sixth and seventh bar code scanners having applied scanning apparatuses according to the invention.

The sixth bar code scanner shown in FIG. 3 is constructed so that the first bar code scanner is further provided with a total number inputting section 120, a judging section 121 and an output controlling section 122, wherein the total number inputting section 120 is further provided with an operation mechanism 131 and a first generating part 132.

The principle of the sixth bar code scanner having applied a scanning apparatus according to the invention is as follows;

The total number inputting section 120 inputs the total number of bar code labels which are objects to be read. Based on the total number of the bar code labels and the number of the chosen sets of consecutive data, the judging section 121 judges whether or not the reading operation has been completed. According to the judgement result, the output controlling section 122 gives to the choosing section 112 an instruction that the chosen sets of consecutive data are transferred to the outputting section 113. The operation mechanism 131 inputs data. The first generating part 132 generates data indicating the numerical quantity in response to an operation carried out with the operation mechanism 131.

The sixth bar code scanner thus constructed functions as follows;

An operator inputs the total number of the bar code labels, which the operator easily grasps, with a simple operation by operating the operation mechanism 131, and the total number is applied through the first generating part 132 to judging section 121.

The seventh bar code scanner shown in FIG. 3 is constructed so that the first bar code scanner is further provided with a total number inputting section 120, a judging section 121 and an output controlling section 122, wherein the total number inputting section 120 is further provided with a detecting part 133 and a second generating part 134.

The principle of the seventh bar code scanner having applied a scanning apparatus according to the invention is as follows;

The total number inputting section 120 inputs the total number of bar code labels which are objects to be read. Based on the total number of the bar code labels and the number of the chosen sets of consecutive data, the judging section 121 judges whether or not the reading operation has been completed. According to the judgement result, the output controlling section 122 gives to the choosing section 112 an instruction to transfer the chosen sets of consecutive data to the outputting section 113. The detecting part 133 extracts candidates corresponding to the bar code symbol indicating the total number. The second generating part 134 generates data indicating numerical quantity according to the candidates.

The seventh bar code scanner thus constructed functions as follows;

The detecting part 133 discriminates and extracts the candidates corresponding to the bar code symbol indicating the number, and the candidates are converted to numerical data by the second generating part 134 and are inputted in the judging section 121.

Hereinafter, referring to FIG. 2, a description is given of the principle of the eighth and ninth bar code scanners having applied scanning apparatuses according to the invention.

Figure 2:
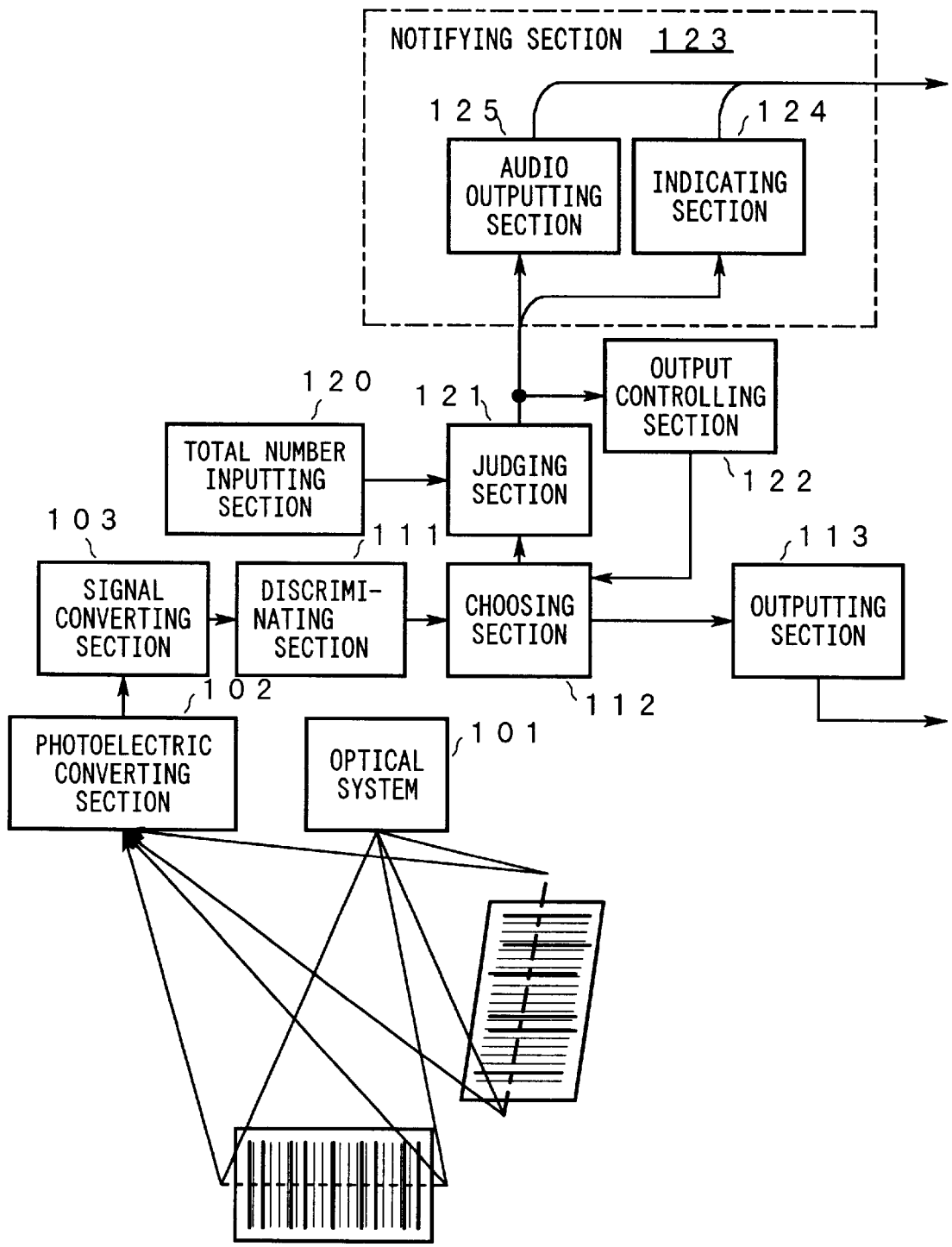
FIG. 2 is a view showing the principle of the eighth and ninth bar code scanners having applied scanning apparatuses according to the invention.

FIG. 2 shows the principle of the eighth and ninth bar code scanners having applied scanning apparatuses according to the invention.

The eighth bar code scanner shown in FIG. 2 is constructed so that the first bar code scanner is further provided with a total number inputting section 120, a judging section 121 and a notifying section 123, wherein the notifying section 123 is provided with an indicating part 124.

The principle of the eighth bar code scanner having applied a scanning apparatus according to the invention is as follows;

The total number inputting section 120 inputs the total number of bar code labels which are objects to be read. Based on the total number inputted by the total number inputting section 120 and the number of the chosen sets of consecutive data, the judging section 121 judges whether or not a reading operation is completed with respect to the bar code labels which are objects to be read. The notifying section 123 notifies an operator of information to support the reading operation in compliance with the judgement result made by the judging section 121. The indicating part 124 indicates a message responsive to the judgement result made by the judging section 121.

The eighth bar code scanner thus constructed functions as follows;

In compliance with the judgement result made by the judging section 121, the indicating part 124 indicates a message with preferably an image expressing whether or not the reading operation has been completed.

The ninth bar code scanner shown in FIG. 2 is constructed so that the first bar code scanner is further provided with a total number inputting section 120, a judging section 121 and a notifying section 123, wherein the notifying section 123 is provided with an audio outputting part 125.

The principle of the ninth bar code scanner having applied a scanning apparatus according to the invention is as follows;

The total number inputting section 120 inputs the total number of bar code labels which are objects to be read. Based on the total number inputted by the total number inputting section 120 and the number of the chosen sets of consecutive data, the judging section 121 judges whether or not the reading operation is completed with respect to the bar code labels which are objects to be read. The notifying section 123 notifies an operator of information to support the reading operation in response to the judgement result made by the judging section 121. The audio outputting part 125 outputs an audio signal in response to the judgement result made by the judging section 121.

The ninth bar code scanner thus constructed functions as follows;

Based on the judgement result made by the judging section 121, the audio outputting part 125 outputs a confirmation sound indicating that the reading operation has been correctly completed, and an alarm sound outputting that the reading operation is continuing.

Hereinafter, referring to FIG. 1, a description is given of the principle of the tenth bar code scanner having applied a scanning apparatus according to the present invention.

The tenth bar code scanner shown in FIG. 1 is constructed so that the first bar code scanner is further provided with a reporting section 126.

The principle of the tenth bar code scanner having applied a scanning apparatus according to the invention is as follows;

The reporting section 126 reports information pertaining to the chosen sets of consecutive data.

The tenth bar code scanner thus constructed functions as follows;

Based on the candidates chosen by the choosing section 112, information pertaining to the sets of consecutive data is prepared by the reporting section 126 and is proposed to an operator as information that expresses the progress of the reading operation.

Hereinafter, with reference to FIG. 4, a description is given of the principle of the eleventh and twelfth bar code scanners having applied scanning apparatuses according to the invention.

Figure 4:
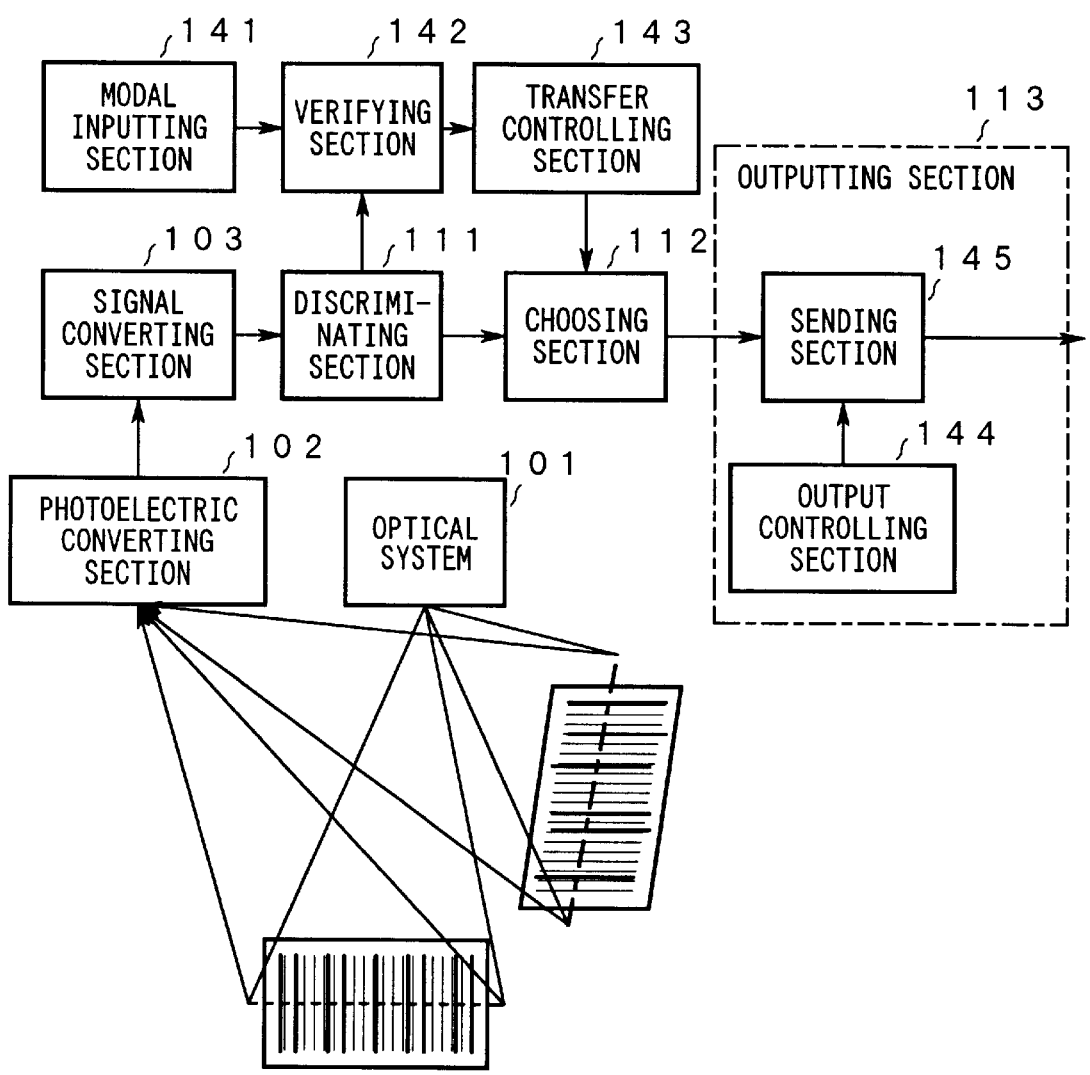
FIG. 4 is a view showing the principle of the eleventh and twelfth bar code scanners having applied scanning apparatuses according to the invention.

FIG. 4 shows a block diagram showing the principle of the eleventh and twelfth bar code scanners having applied scanning apparatuses.

The eleventh bar code scanner shown in FIG. 4 is constructed so that the first bar code scanner described above is further provided with a modal inputting section 141, a verifying section 142, and a transfer controlling section 143.

The principle of the eleventh bar code scanner having applied a scanning apparatus according to the invention is as follows;

The modal inputting section 141 inputs a modal instruction to point out a reading mode suitable for a set of bar code labels of an object to be read. The verifying section 142 verifies the correctness of the sets of consecutive data chosen by the choosing section 112 according to the identification a plurality of sets of consecutive data extracted by the discriminating section 111 in response to an input of a specified modal instruction. The transfer controlling section 143 controls an action of transferring the chosen sets of consecutive data to the outputting section 113 in response to the verification result made by the verifying section 142.

The eleventh bar code scanner thus constructed functions as follows;

In such a bar code scanner, it is possible to verify the correctness of the sets of consecutive data that are repeatedly extracted by the verifying section 142 mutually comparing the consecutive data when a specified reading mode is inputted by the modal inputting section 141, based on the fact that in a case where a plurality of bar code labels having the same bar code symbols are objects to be read. The transfer controlling section 143 controls whether or not the set of consecutive data is transferred to the outputting section 113.

The twelfth bar code scanner shown in FIG. 1 is constructed so that the first bar code scanner described above is further provided with a modal inputting section 141, wherein the outputting section 113 is further provided with an output controlling part 144 and sending part 145.

The principle of the twelfth bar code scanner having applied a scanning apparatus according to the invention is as follows;

The modal inputting section 141 inputs a modal instruction to point out a reading mode suitable for a set of bar code labels of an object to be read. The output controlling part 144 instructs an output of the reading result in response to a predetermined operation when a modal instruction is inputted, which designates a reading mode suitable in the case where a plurality of bar code labels having the same bar code symbols are objects to be read. The sending part 145 outputs the reading result corresponding to the chosen sets of consecutive data, for each output instruction issued.

The twelfth bar code scanner thus constructed functions as follows;

Since the sending part 145 makes outputs equivalent to the number of times by which the output controlling part 144 inputs instructions when a mode specified above is inputted by the modal inputting section 141, the reading result corresponding to the chosen set of consecutive data is repeatedly outputted.

Hereinafter, referring to FIG. 5, a description is given of the principle of the first through ninth optical code readers having applied optical reading apparatuses according to the invention.

Figure 5:
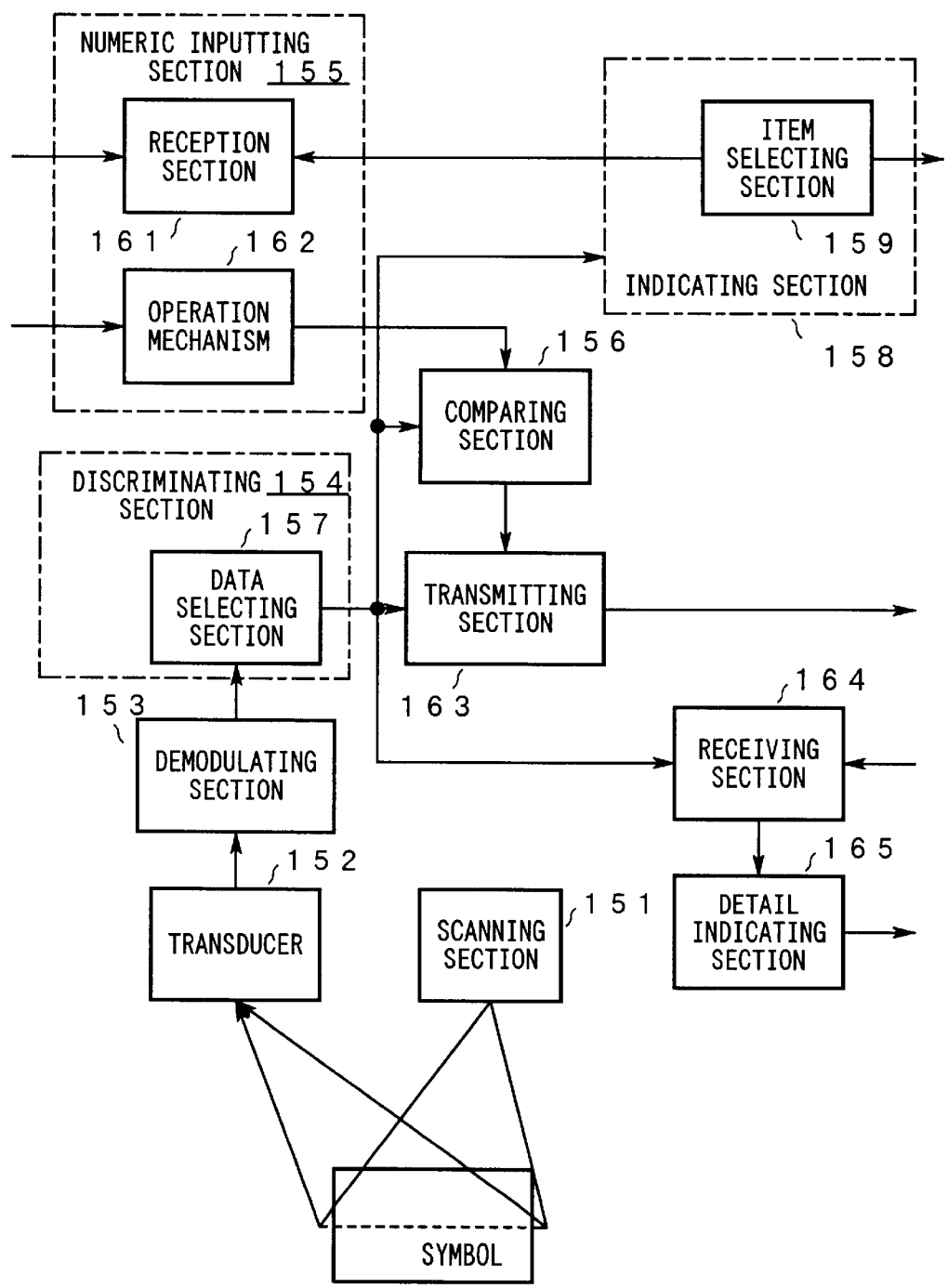
FIG. 5 is a view showing the principle of the first and ninth optical code readers having applied optical reading apparatuses according to the invention.

FIG. 5 shows the principle of the first through ninth optical code readers having applied optical reading apparatuses according to the invention.

The first optical code reader shown in FIG. 5 is provides with a scanning section 151, a transducer 152, a demodulating section 153, a discriminating section 154, a numeric inputting section 155 and a comparing section 156.

The principle of the first optical code reader having applied an optical reading apparatus according to the invention is as follows;

The scanning section 151 generates a scanning laser beam that scans an optical readable symbol and scans a scanning field by using the laser beam. The transducer 152 generates electric signals corresponding to the amount of received light upon receiving light reflected from the symbol. The demodulating section 153 demodulates the electric signals outputted from the transducer 152 and reproduces the data recorded as the symbol. The discriminating section 154 extracts data that are different from each other, from the data reproduced by the demodulating section 153. The numeric inputting section 155 accepts the input of the numeric data. The comparing section 156 compares the numeric data inputted by the numeric inputting section 155 with the number of the data extracted by the discriminating section 154.

The first optical code reader thus constructed functions as follows;

The scanning laser beam generated by the scanning section 151 scans a plurality of symbols, and the electric signals generated then in correspondence to diffusely reflected light are obtained by the transducer 152, wherein they are demodulated by the demodulating section 153. Since the discriminating section 154 extracts sets of data that are different from each other, it is possible to collectively read the information recorded as these symbols.

The second optical code reader shown in FIG. 5 is constructed so that, in the first optical code reader described above, the discriminating section 154 is further provided with a data selecting part 157.

The principle of the second optical code reader having applied an optical reading apparatus according to the invention is as follows;

The data selecting part 157 selects sets of data consecutively expressing the top to end of each symbol without any interruption.

The second optical code reader thus constructed functions as follows;

The sets of data including whole data expressed by the respective symbols are selected by the data selecting part 157 from the sets of data obtained by the demodulating section 153 in the discriminating section 154, whereby the correctness of the sets of data extracted by the discriminating section 154 is ensured.

The third optical code reader shown in FIG. 5 is constructed so that the first optical code reader described above is further provided with an indicating section 158.

The principle of the third optical code reader having applied an optical reading apparatus according to the invention is as follows;

The indicating section 158 indicates the sets of data extracted by the discriminating section 154.

The third optical code reader thus constructed functions as follows;

Since the indicating section 158 indicates the sets of data obtained by the discriminating section 154, information pertaining to the progress of a reading operation is proposed to an operator, thereby supporting the reading operation.

The fourth optical code reader shown in FIG. 5 is constructed so that the first optical code reader described above is provided with the indicating section 158, wherein the indicating section 158 is further provided with an item selecting part 159.

The principle of the fourth optical code reader having applied an optical reading apparatus according to the invention is as follows;

The indicating section 158 indicates the data extracted by the discriminating section 154. The item selecting part 159 selects at least one of the sets of data extracted by the discriminating section 154 as an object to be displayed.

The fourth optical code reader thus constructed functions as follows;

The data selected by the item selecting part 159 among the sets of data extracted by the discriminating section 154 are selectively displayed.

The fifth optical code reader shown in FIG. 5 is constructed so that the first optical code reader is further provided with an indicating section 158, wherein the indicating section 158 is further provided with an item selecting part, and the numeric inputting section 155 is provided with a reception part 161.

The principle of the fifth optical code reader having applied an optical reading apparatus according to the invention is as follows;

The indicating section 158 indicates the sets of data extracted by the discriminating section 154. The item selecting part 159 selects at least one of the sets of data extracted by the discriminating section 154 as the object to be displayed. The reception part 161 receives an input pertaining to the number of articles to which the corresponding symbol indicated by selected sets of data is attached, corresponding to the set of data selected by the item selecting part 159 as an object to be displayed.

The fifth optical code reader thus constructed functions as follows;

In a state where the set of data selected by the item selecting part 159 are selectively displayed by the indicating section 158, the reception part 161 receives an input of the number of articles to which the symbol corresponding to the selected set of data.

The sixth optical code reader shown in FIG. 5 is constructed so that, in the first optical code reader described above, the numeric inputting section 155 is further provided with an operation mechanism 162.

The principle of the sixth optical code reader having applied an optical reading apparatus according to the invention is as follows;

The operation mechanism 162 inputs a predetermined number in response to a single operation.

The sixth optical code reader thus constructed functions as follows;

A predetermined number is inputted whenever an operator operates the operation mechanism 162, and is sent to the comparing section 156 to be compared with the number of sets of data extracted by the discriminating section 154.

The seventh optical code reader shown in FIG. 5 is constructed so as to be provided with a transmitting section 163 in the first optical code reader.

The principle of the seventh optical code reader having applied an optical reading apparatus according to the invention is as follows;

The transmitting section 163 outputs the sets of data extracted by the discriminating section 154 to an external device.

The seventh optical code reader thus constructed functions as follows;

The sets of data extracted by the discriminating section 154 are outputted to an external device by the transmitting section 163.

The eighth optical code reader shown in FIG. 5 is constructed so that the first optical code reader is further provided with a receiving section 164 and a detail indicating section 165.

The principle of the eighth optical code reader having applied an optical reading apparatus according to the invention is as follows;

The receiving section 164 receives the details corresponding to the data obtained by the discriminating section 154 from the external device. The detail indicating section 165 indicates the details.

The eighth optical code reader thus constructed functions as follows;

The receiving section 164 receives the detail from the external device corresponding to the sets of data obtained by the discriminating section 154, and the detail indicating section 165 indicates the detailed information and propose the same to an operator.

The ninth optical code reader shown in FIG. 5 is constructed so that the first optical code reader is further provided with a transmitting section 163, wherein the transmitting section 163 is further provided with a transmission controlling part.

The principle of the ninth optical code reader having applied an optical reading apparatus according to the invention is as follows;

The transmitting section 163 transmits the sets of data extracted by the discriminating section 154 to an external device, and the transmission controlling part controls the transmission in response to the comparison result made by the comparing section 156.

The ninth optical code reader thus constructed functions as follows;

Where the comparing section 156 compares the number inputted by the numeric inputting section 155 with the number of the sets of data obtained by the discriminating section 154 and judges that the numbers are equal to each other, the transmission controlling section 166 permits an output of the sets of data extracted by the discriminating section 154, and the transmitting section 163 transmits the sets of data.

Embodiment 1

Hereinafter, a detailed description is given of an embodiment of the invention with reference to the accompanying drawings.

First, a description is given of a reading operation of a bar code symbol applied to a bar code scanner according to the invention.

First, objects to be read are arranged on a checkout counter or table with their bar code label turned upward.

Next, by moving the bar code scanner or holding the bar code scanner so as to face it above the objects, the bar code labels adhered or printed onto these objects (articles) are scanned to collect diffusely reflected light from objects.

At this time, for example, if an operator slowly approaches the exit window (aperture) of the bar code scanner to the articles or moves the bar code scanner above these articles so as to draw a circle, it is possible to collect diffusely reflected light of all the bar code symbols.

Herein, the optical system equipped in the bar code scanner is provided with a laser beam source and a scanning mechanism to emit a laser beam. The scanning mechanism that scans a laser beam in various directions for scanning is provided with a plurality of patterning mirrors whose mounted positions and mounted angles are different from each other. By causing the laser beam reflected by a polygon mirror, etc., to be further reflected by these patterning mirrors, a scanning pattern shown in FIG. 6(*a*) can be accomplished. According to such a scanning mechanism, since the laser beam for scanning is scanned at a high speed, it is possible to scan almost all the bar code labels adhered or printed onto these articles by the laser beam exited from the exit window (aperture), as shown in FIG. 6(*a*), while an operator operates the bar code scanner as described above.

Figure 6:
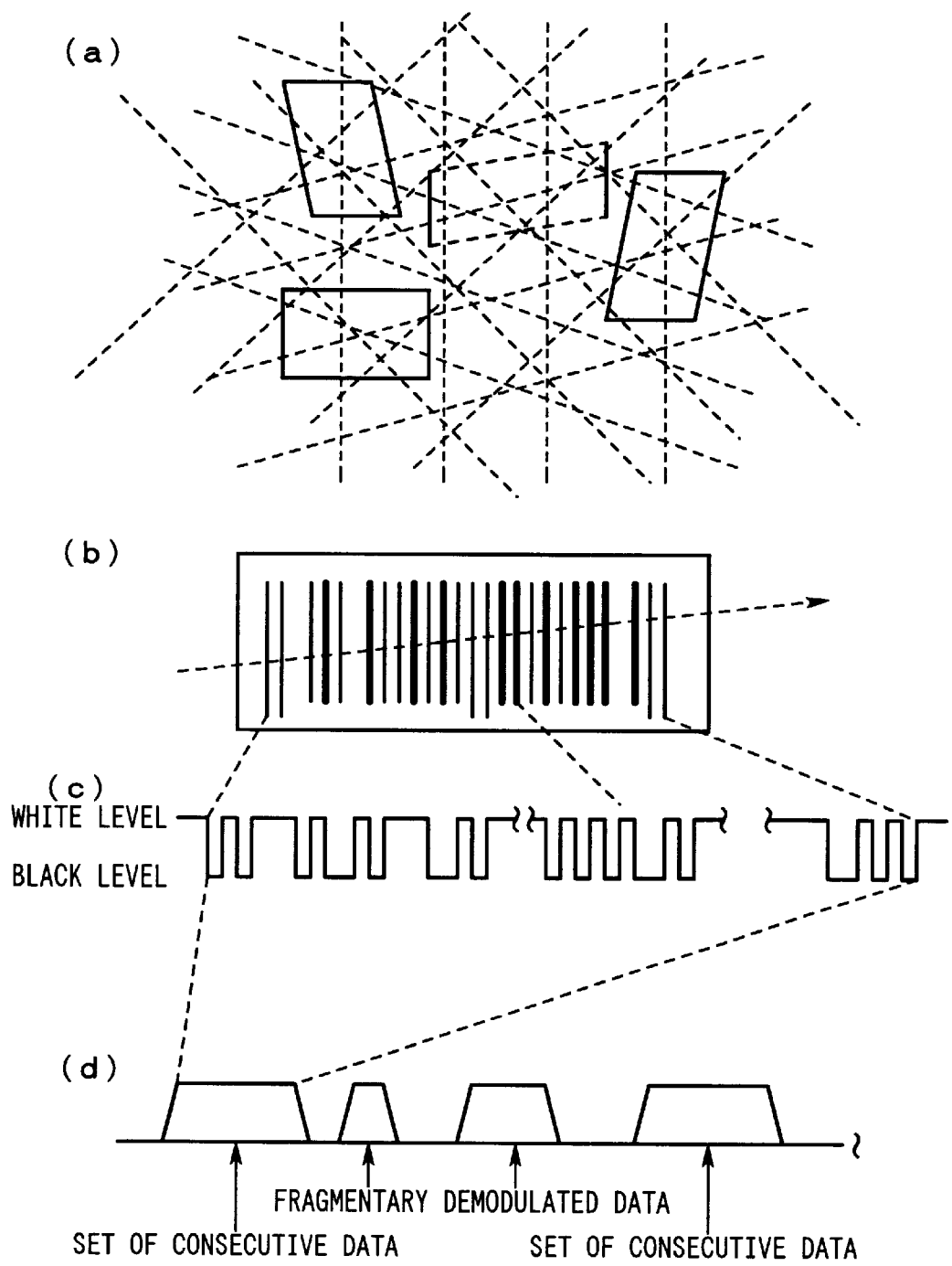
FIG. 6 is a view explaining a reading operation.

In the scanning pattern as shown in FIG. 6(*a*), since the scanning is carried out by the laser beams scanning in various directions, it is expected that either of the laser beams that constitutes the scanning pattern can consecutively scan all the elements included in a bar code symbol from one guard bar to the other guard bar, as shown in FIG. 6(*b*), without any interruption with respect to the respective bar code symbols recorded in bar code labels adhered or printed onto the respective articles.

And, if all the elements from one guard bar to the other guard bar are consecutively scanned by a laser beam with respect to one bar code symbol, it is possible to read all the elements that constitute the corresponding bar code symbol at one time by demodulating electric signals (refer to FIG. 6(*c*)) obtained by the photo acceptance unit at this time.

Therefore, demodulated data that fragmentarily express a part of the bar code symbol are excluded from a series of the demodulated data (refer to FIG. 6(*d*)) obtained by sequentially demodulating the electric signals consecutively obtained by the photo acceptance unit. And, when demodulated data (hereinafter called "a set of consecutive data") obtained when consecutively scanning all the elements constituting the bar code symbol are respectively extracted, information regarding all the bar code symbols of an object to be read can be obtained without combining the fragmentarily reading result.

Herein, for example, if the bar code symbols adhered or printed onto a plurality of articles are different from each other as in a case where articles of objects to be read are different from each other, the set of consecutive data obtained as described above can be classified into the same number of types as the number of articles. In this case, the overlapping sets of consecutive data classified as the same are generated by scanning the bar code label adhered or printed onto the same article a plurality of times. The number of the extracted sets of consecutive data can be made identical to that of objects to be read, by extracting the sets of consecutive data that are different from each other. That is, the number of the extracted sets of consecutive data can be utilized as the number of articles being objects to be read.

However, in fact, the same bar code symbol is indicated on a bar code label corresponding to the same articles. Therefore, in cases where a plurality of the same articles exist among articles that are objects to be read, the same sets of consecutive data is generated by scanning individually the same article two or more times and by scanning the same two or more articles. And, only by analyzing the demodulating data obtained by demodulating electric signals obtained by the photo acceptance unit, it is not possible to judge whether the same sets of consecutive data are obtained by scanning the same article two or more times or by individually scanning same two or more articles. Since the number of sets of consecutive data, included in a series of the demodulated data, that are different from each other is not coincident with the number of articles being object to be read in cases where a plurality of the same articles are included in the objects to be read. Therefore, in that case, the number of the extracted sets of consecutive data cannot be utilized as the number of the articles that are objects to be read.

On the other hand, an operator who operates a bar code scanner can judge, without any difficulty, whether or not the same articles are included in objects to be read and the respective numbers of the same articles.

A bar code scanner according to one embodiment of the invention can exclude the repeatedly extracted sets of consecutive data, receives an input of knowledge or information that the operator intuitively grasps, and can collectively read a plurality of bar code symbols on the basis of the input and a series of the demodulated data obtained as described above.

Figure 7:
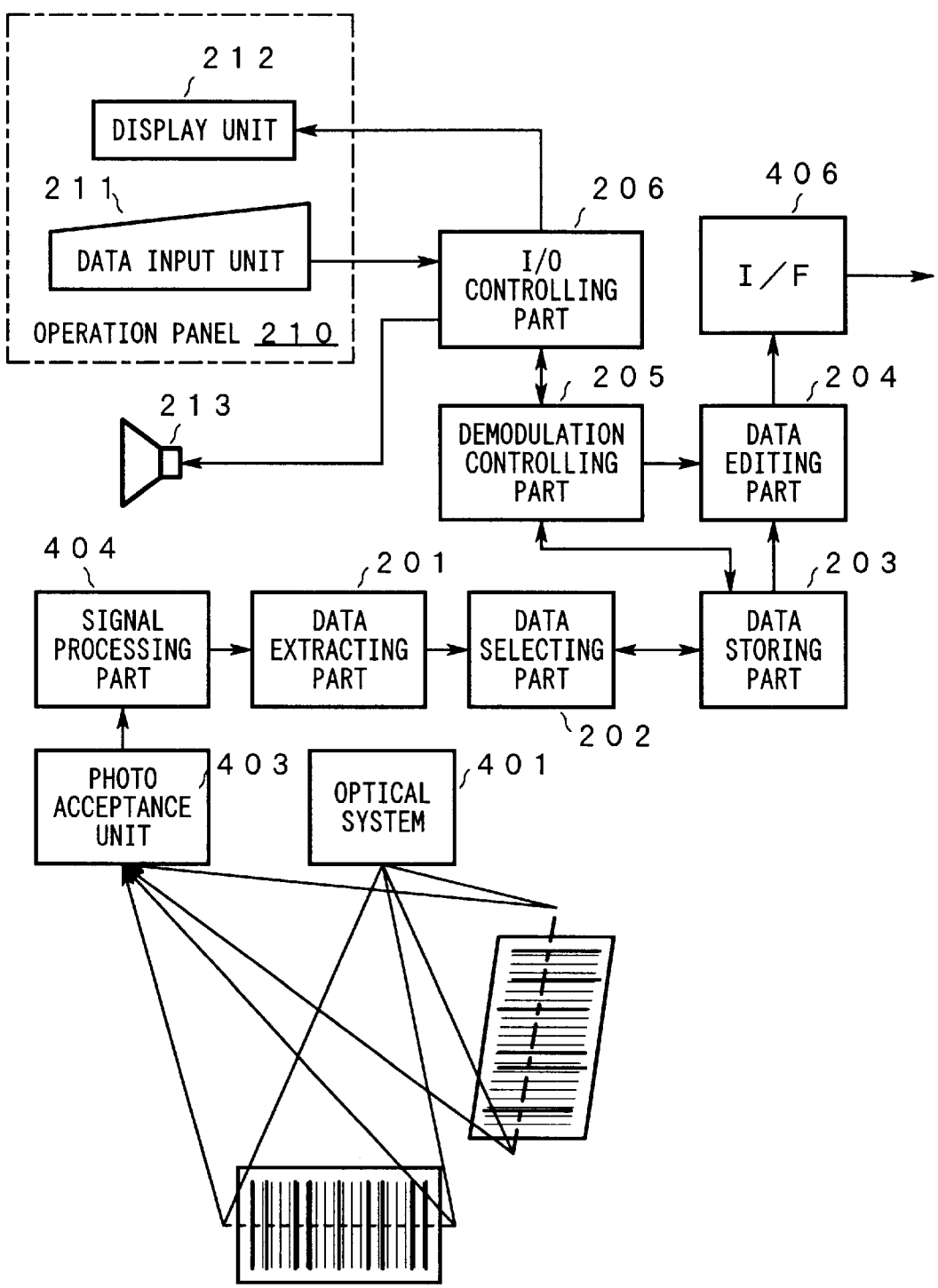
FIG. 7 is a view showing a first embodiment of the first through fourth bar code scanners having applied scanning apparatuses according to the invention.

FIG. 7 shows the first embodiment of the first through fourth bar code scanners according to the invention.

Figure 19:
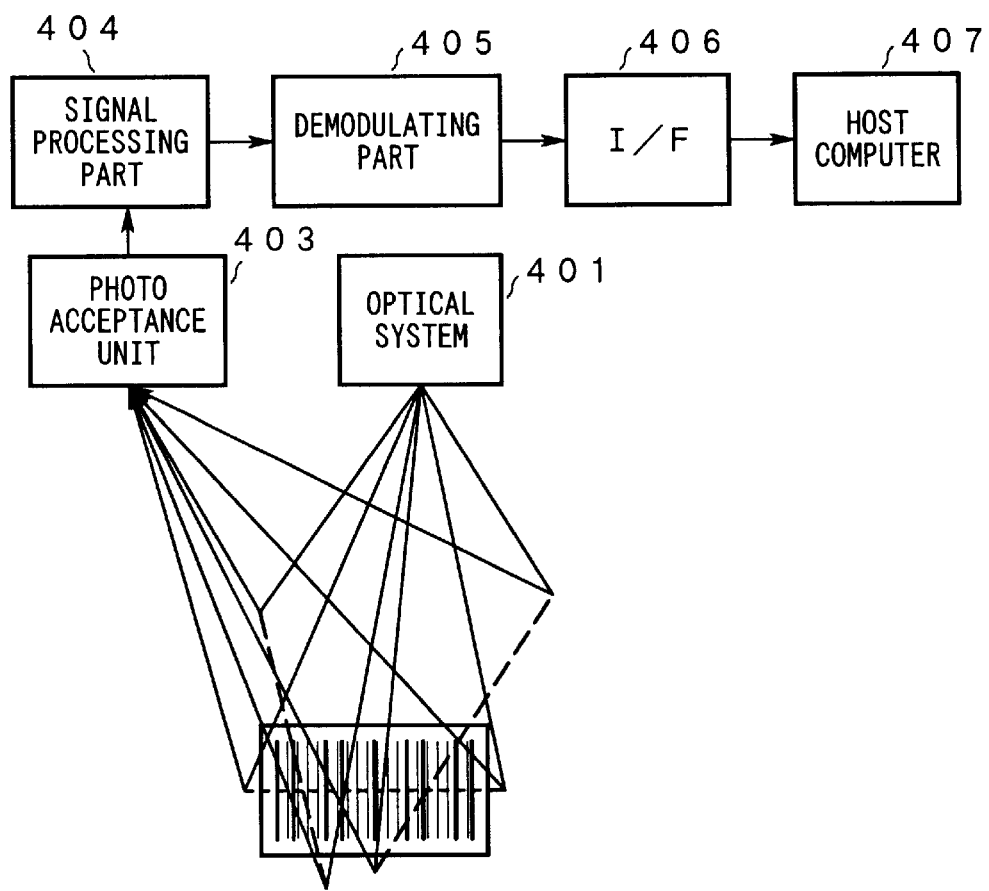
FIG. 19 is a configurational view showing the construction of a prior art fixed laser scanner.
Figure 20:
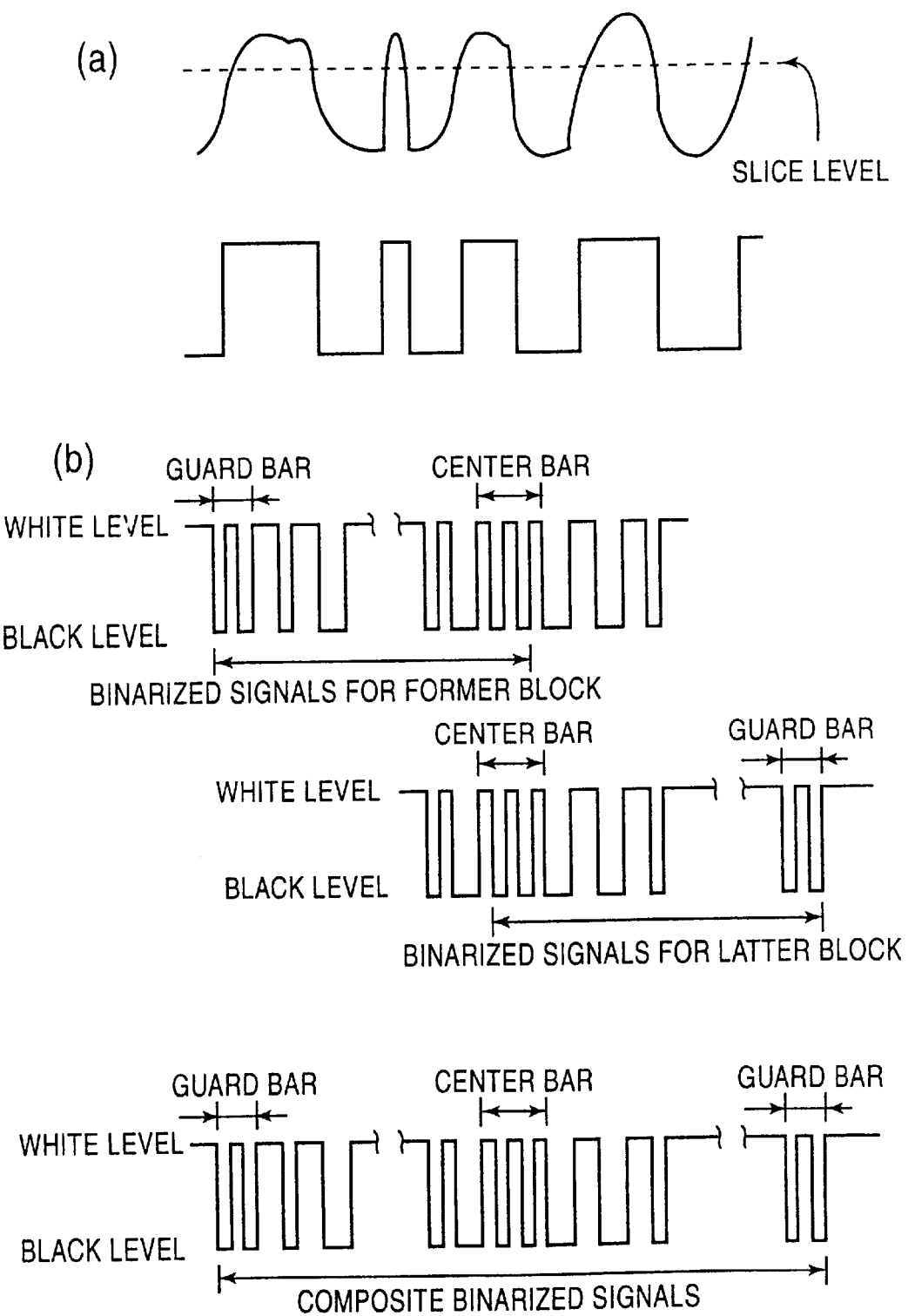
FIG. 20 is a view explaining a reading operation of the fixed laser scanner.

Also, in FIG. 7, parts that have the same function and construction as those of the components shown in FIG. 19 are given the same reference numbers, and overlapping description thereof is omitted.

In the bar code scanner shown in FIG. 7, binarized signals obtained by binarization by a signal processing part 404 are inputted in a data extracting part 201.

The data extracting part 201 extracts sets of portions of binarized signal provided with predetermined features by analyzing the pulse width and interval of the above-described binarized signals, and at the same time demodulate each portion of binarized signals, wherein the demodulated data thus obtained are transferred, as a set of consecutive data, to the data selecting part 202 from time to time.

The data selecting part 202 selects new sets of consecutive data that are different from the sets of consecutive data stored in the data storing part 203, with reference to the sets of consecutive data stored by the data storing part 203. The data storing part 203 stores the sets of consecutive data selected by the data selecting part 202. As a result, sets of consecutive data that are different from each other are accumulated in the data storing part 203.

The data inputted by an operator through the data input unit 211 secured on the operation panel 210 are transferred to the demodulating controlling part 205 through the input/output controlling part 206.

Based on the data, the demodulation controlling part 205 prepares instructions to the data editing part 204 and data storing part 203. At the same time, the demodulation controlling part 205 controls actions of a display unit 212 and speaker 213, which are provided on the operation panel 210, through the input/output controlling part 206.

Based on the sets of consecutive data stored by the data storing part 203 and instruction received from the demodulation controlling part 205, the data editing part 204 shown in FIG. 7 edits the reading result and outputs the same to the host computer via an interface controlling part (I/F) 406.

In addition, FIG. 13 shows the appearance of a bar code scanner according to the invention.

As shown in FIG. 13, the operation panel 210 may be disposed at a plane opposed to the exit window (aperture) through which a laser beam exits. It is preferable that the operation panel 210 is located at a position where reading operations can be easily carried out, and the panel can be easily operated. Also, the speaker 213 may be disposed on a side of the bar code scanner.

Hereinafter, a description is given of a bar code reading operation made by the bar code scanner shown in FIG. 7.

Figure 8:
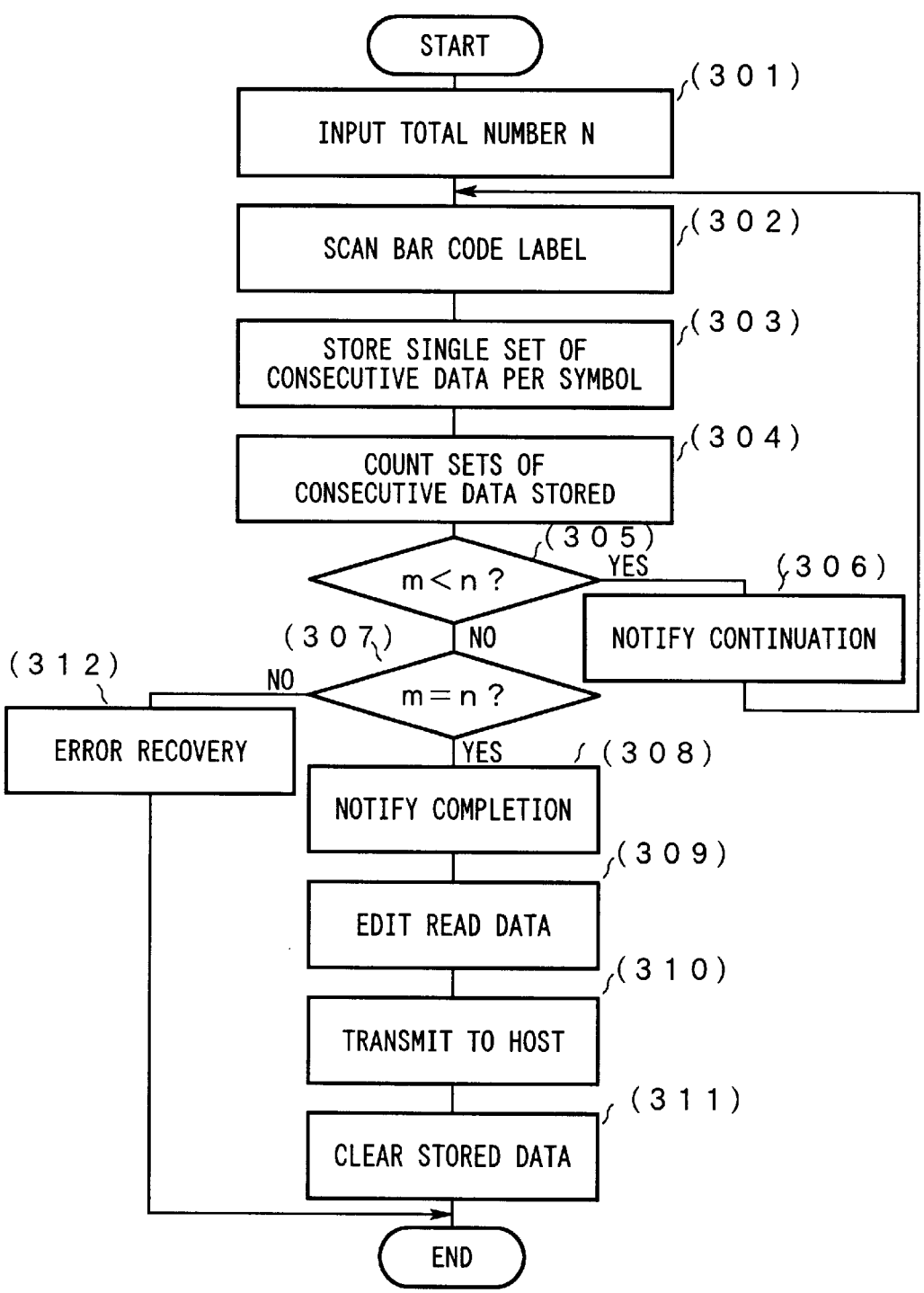
FIG. 8 is a flow chart expressing an operation for collectively reading a plurality of bar code symbols.
Figure 9:
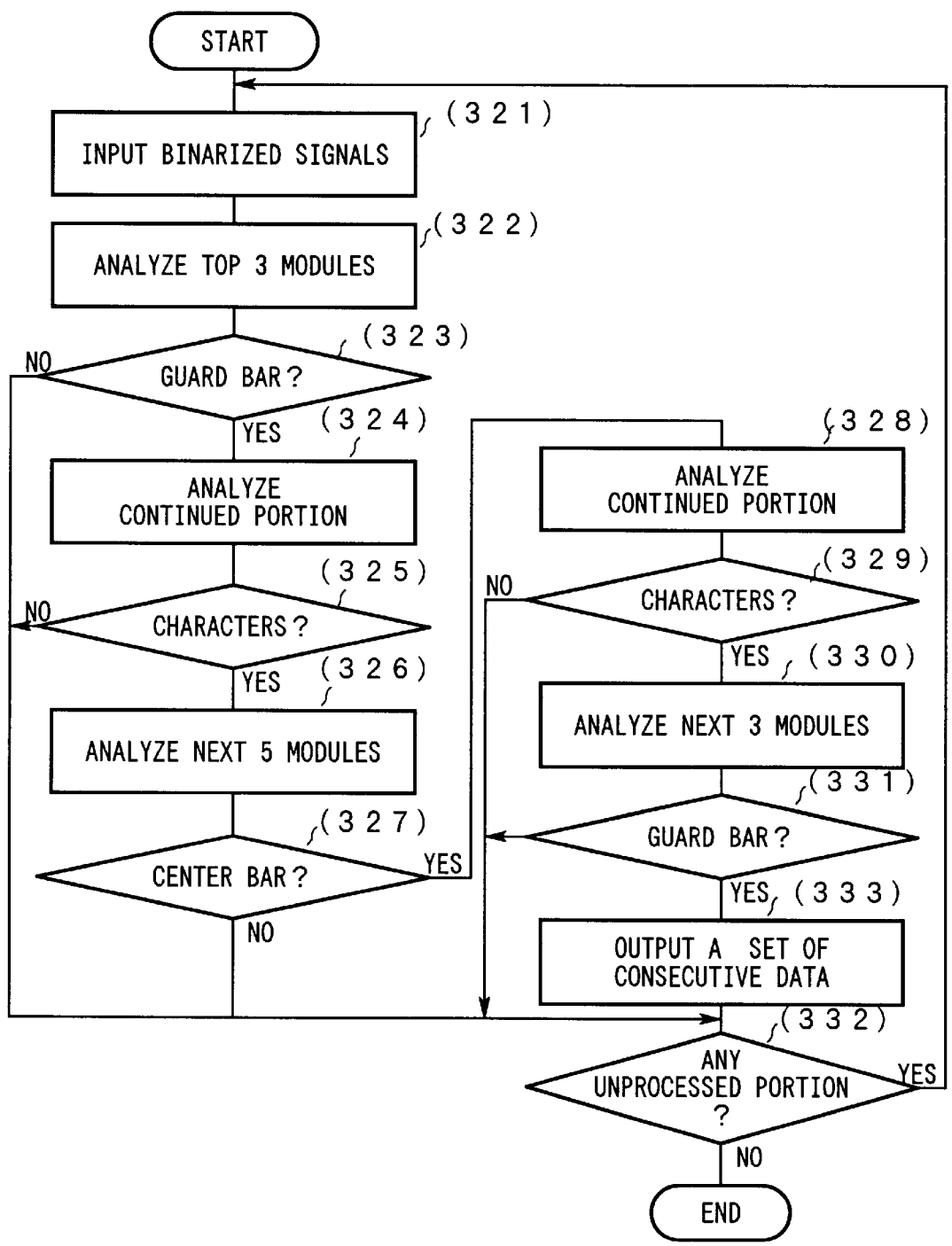
FIG. 9 is a flow chart expressing an action of extracting a set of consecutive data.

FIG. 8 is a flow chart showing an operation for collectively reading a plurality of bar code symbols. Also, FIG. 9 is a flow chart showing an operation for extracting sets of consecutive data.

Herein, a description is based on the case where each bar code label of objects to be read is of different types.

First, prior to reading bar code symbols, an operator inputs the total number n of articles that are objects to be read, by using a numeric inputting key, etc., which is provided on the above-described operation panel 210 (Step 301 in FIG. 8). And, the total number n is transferred to the demodulation controlling part 205 via the input/output controlling part 206.

Next, for example, while an operator holds the handle (refer to FIG. 13) attached to the bar code scanner and moves the bar code scanner, scans the objects, which are articles placed on the check-out counter as shown in FIG. 6(a) (Step 302).

At this time, light diffused by the bar code labels adhered or printed onto these articles is made incident into the photo acceptance unit 403 via the exit window (aperture) and is converted to electric signals corresponding to the intensity thereof. After that, the electric signals are further converted to binarized signals by the signal processing part 404.

Further, sets of consecutive data are sequentially extracted from the binarized signals by the data extracting part 201, and the repeated sets of consecutive data thus extracted are excluded by the data selecting part 202, whereby only exclusive sets of consecutive data that are different from each other are stored in the data storing part 203 (Step 303).

Hereinafter, referring to FIG. 9, a description is given of an operation for extracting sets of consecutive data and an operation for excluding the overlapping sets of consecutive data. Also, in the following description, a process of the UPC/EAN-based bar code is described as an example.

When the data extracting part 201 newly receives binarized signals (Step 321 in FIG. 9), first, the portion corresponding to the top three modules of the bar code symbol is analyzed (Step 322), and it is judged whether or not the portion of the binarized signals signifies the guard bar (Step 323).

If the judgement in Step 323 is positive, the data extracting part 201 further analyzes the portion continued from the binarized signals of the above-described three module (Step 324), wherein it is judged whether or not the portion of the binarized signals signifies predetermined number of characters (Step 325).

If the judgement in Step 325 is positive, the data extracting part 201 further analyzes the binarized signals of the five modules continued from the portion corresponding to the above-described predetermined number of characters (Step 326), wherein it is judged whether or not the portion of the binarized signals signifies the center bar (Step 327).

If the judgement in Step 327 is positive, the data extracting part 201 still further analyzes the portion continued from the binarized signals of the five modules analyzed in Step 324 (Step 328), wherein it is judged whether or not the portion of the binarized signals indicates a predetermined number of characters (Step 329).

Where the judgement in Step 329 is positive, the data extracting part 201 further analyzes the binarized signals of three modules continued from the portion analyzed in Step 329 (Step 330), wherein it is judged whether or not the portion of the binarized signals signify the guard bar (Step 331).

If the judgement in any one of Step 323, Step 325, Step 327, Step 329 and Step 331 is negative, the binarized signals till the portion taken note of in the respective Steps signify fragmentary data generated by fragmentarily scanning a part of a bar code symbol by a scanning laser beam. In this case, in Step 332, it is judged whether or not there are unprocessed binarized signals. If the judgement in Step 332 is positive, the process is returned to Step 321, the process is continued in connection with new binarized signals, and if the judgement is negative, the process is terminated.

On the other hand, wherein the judgement in Step 331 is positive, the data extracting part 201 outputs, as the set of consecutive data, the demodulated result obtained by analyzing the binarized signals which is from the portion corresponding to the top three modules judged to indicate the guard bar in the above-described Step 323, to the portion corresponding to the three modules judged to indicate the guard bar in Step 331. Then, the data extracting portion 201 transfers the result to the data selecting part 202 (Step 333), so that the process may shift to Step 332.

At this time, in the case where the newly inputted set of consecutive data are not coincident with any one of the sets of consecutive data stored by the data storing part 203, the newly inputted set of consecutive data may be added to the content of the data storing part 203.

Thus, the overlapped data are excluded from the sequentially extracted sets of consecutive data, and only the sets of consecutive data that are different from each other may be stored in the data storing part 203.

The demodulation controlling part 205 counts the number m of the stored sets of consecutive data with reference to the data storing part 203, for example, once every predetermined duration of time since the commencement of the reading operation (Step 304 in FIG. 8), wherein, in the case where the number m of the sets of consecutive data is less than the total number n of the objects to be read, that is inputted in Step 301, the judgement in Step 305 is made positive.

At this time, the demodulation controlling part 205 prepares, for example, a message to continue the reading operation and an audio output instruction, and they are transferred to the input/output controlling part 206.

In line therewith, the input/output controlling part 206 controls functions of displaying by the display unit 212 and of audio outputting by the speaker 213, whereby a message indicating that the reading operation is continuing is displayed on a liquid crystal display equipped in the display unit 212, and at the same time, outputs an alarm sound through the speaker 213. Thus, the operator is notified of that the reading operation is continuing (Step 306).

In this case, the bar code scanner returns to Step 302 and continues the reading operation. And, when new sets of consecutive data which are consecutive data not stored in the data storing part 203 are extracted in line with the continuation of the reading operation, they are added to the content of the data storing part 203.

Thus, the new sets of consecutive data are gradually added to the content of the data storing part 203, and where the number m of the sets of consecutive data stored in the data storing part 203 is equal to the total number n of objects to be read, the judgement in Step 305 is negated, and the judgement in Step 307 is made positive.

At this time, the demodulation controlling part 205 prepares, for example, a message indicating that the reading operation has been completed, and an audio output instruction, wherein they are transferred to the input/output controlling part 206.

In line therewith, the input/output controlling part 206 controls the functions of displaying by the liquid crystal display and audio outputting by the speaker 213. Therefore, a message indicating the reading operation has been completed is displayed on the liquid crystal display, and at the same time an adequate sound, which notifies an operation of the completion of the reading operation is outputted through the speaker 213, wherein the operator is notified of the completion of the reading operation (Step 308).

Thereafter, based on the instruction from the demodulation controlling part 205, the data editing part 204 edits reading result of a predetermined format (Step 309) and transmits the reading result to host machine (not shown) such as a POS terminal (Step 310).

Finally, the demodulation controlling part 205 the content of the data storing part 203 is cleared (Step 311), and the demodulating process corresponding to a single reading operation may be terminated.

Thus, where an object to be read consists of bar code labels indicating bar code symbols respectively different from each other, a single set of consecutive data is stored with respect to respective bar code symbols, wherein it is possible to collectively read all the bar code labels.

On the other hand, in this case, where sets of consecutive data exceeding the total number n of the bar code labels of objects to be read are extracted (where the judgement in Step 307 is negative), there is a possibility that an error occurs in any one of the sets of consecutive data. Therefore, an adequate error recovery process is carried out in order to make request to the operator to make a judgement (Step 312).

In the example shown in FIG. 8, the total number n of the bar code labels of objects to be read is inputted in the bar code scanner as knowledge that the operator intuitively grasps, prior to a reading operation of the bar code, and in Step 305, the total number n is utilized as the reference for judging whether or not all the bar code labels of objects to be read have been read. It is possible to read a plurality of bar code labels of objects to be read without any omissions, effectively utilizing the knowledge that the operator intuitively grasps, by continuously scanning the bar code labels in response to the judgement result when the number of the bar code labels that has been read is less than the above-described total number n.

Further, according to the judgement result in Step 305 described above, effective information to support the reading operation can be provided to the operator in the respective phases of the reading by a bar code scanner by notifying him of the continuation of reading or the completion of reading.

In addition, instead of receiving an input of the total number n of objects to be read as described above, the bar code scanner may be constructed that an operator can confirm the number of bar code labels that have already been read. In this case, the demodulation controlling part 205 processes to display the number m of the sets of consecutive data stored after Step 304 instead of processing Step 301 shown in FIG. 8, and instead of Step 305, a process is carried out to judge whether the reading operation is to be continued, has been completed normally, or has been completed imperfectly, in response to the input signifying that the operator have confirmed that the number m of the displayed sets of consecutive data is equal to the number of n of articles, wherein the process may proceeds to either one of Step 306, Step 308 or Step 312 in compliance with the judgement result.

Embodiment 2

Next, a description is given of a method of composing demodulated data equivalent to the set of consecutive data by combining the fragmentary demodulated data obtained when scanning a part of a bar code symbol.

Figure 10:
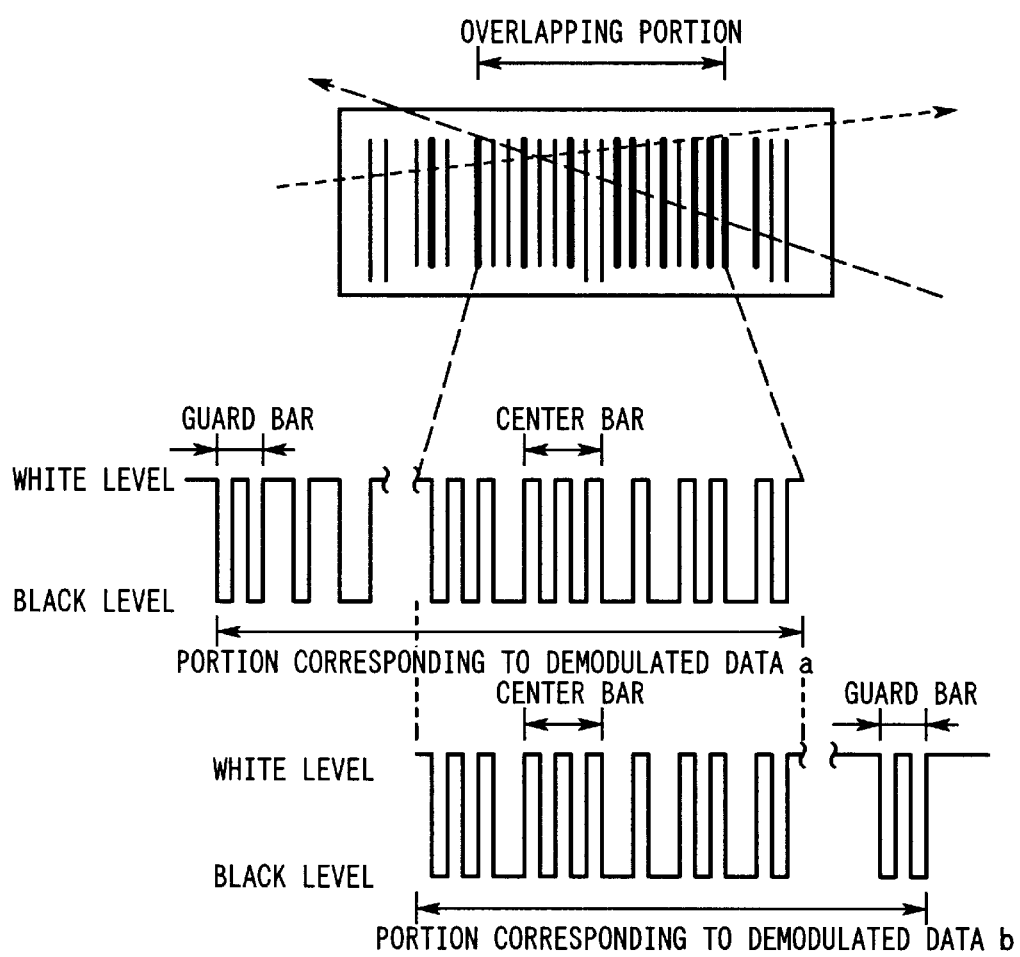
FIG. 10 is a view explaining a method for combining fragmented demodulated data.

FIG. 10 is a view explaining a combining method of fragmented demodulated data.

As shown in FIG. 10, one fragmented demodulated data, which is demodulated data A obtained when having scanned a part of the left block and the whole right block of a bar code symbol by a scanning laser beam, are compared with another fragmented demodulated data, which is demodulated data B obtained when having scanned a part of the right block and the whole left block of the same bar code, wherein the data corresponding to a part of the right block included in the demodulated data A are equal to the data of the corresponding portion of the demodulated data B, and the data corresponding to a part of the left block of the demodulated data B are equal to the data of the corresponding portion of the demodulated data A.

To the contrary, where the above-described comparison is carried out with respect to the fragmented demodulated data obtained by scanning two different bar code symbols, there is a very slight possibility in that a plurality of characters included in overlapped characters over a predetermined range including the center bar are completely equal to or identical with each other.

Therefore, with respect to the demodulated data including the whole left block and a plurality of characters continued therefrom and the other demodulated data including the whole right block and a plurality of characters continued therefrom, when a plurality of characters included in the overlapped characters over a predetermined range including the center bar are compared with each other and are completely equal to or identical with each other, it can be judged that these two demodulated data have been obtained when having scanned the same bar code symbol. And by combining these demodulated data, it is possible to obtain the demodulated data equivalent to the set of consecutive data.

Figure 11:
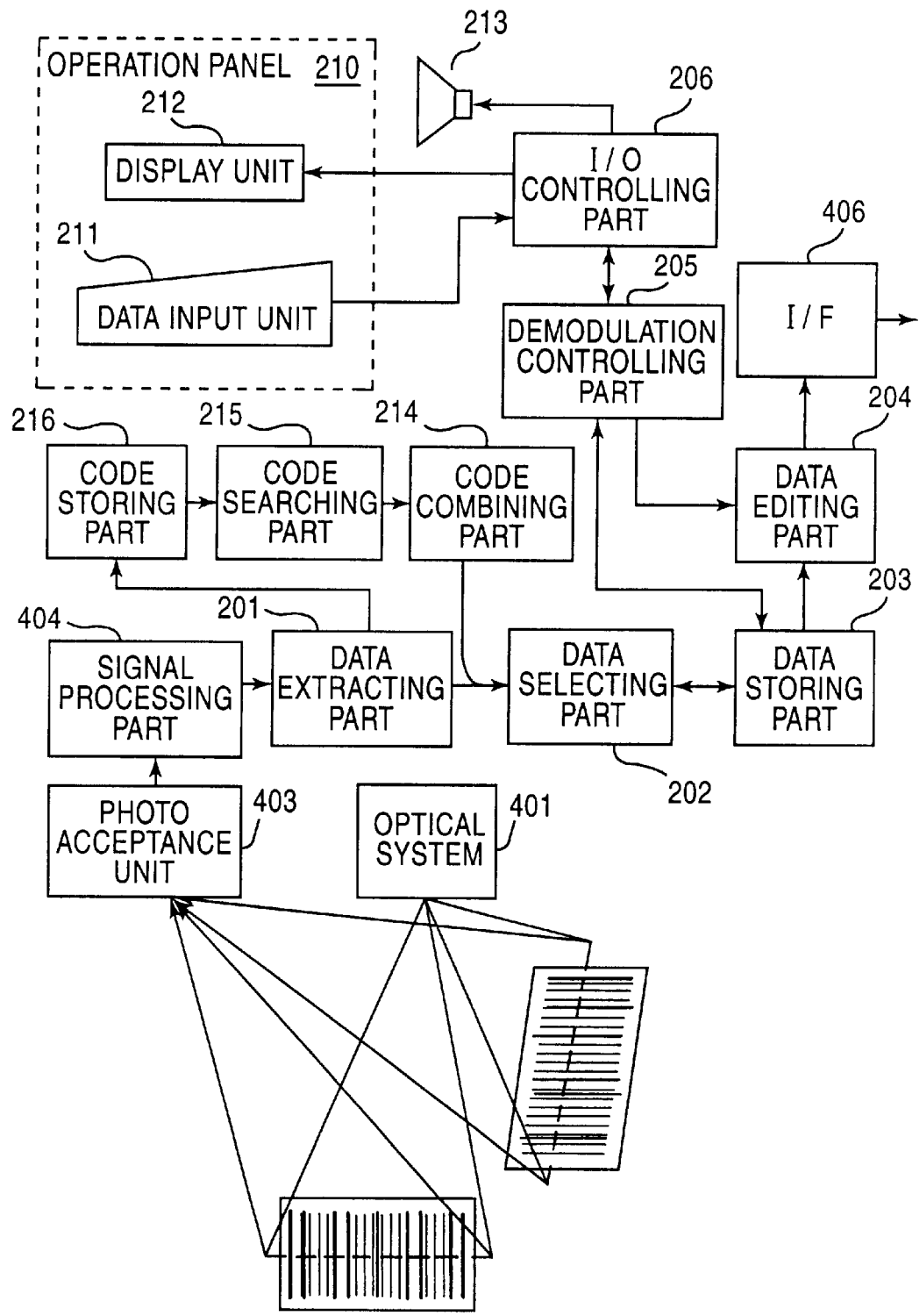
FIG. 11 is a view showing a second embodiment of a bar code scanner according to the invention.

FIG. 11 shows the second embodiment of a bar code scanner according to the invention.

The bar code scanner shown in FIG. 11 is provided with a code combining part 214 and a code searching part 215 and a code storing part 216 in addition to the respective parts equipped in the bar code scanner shown in FIG. 7.

Also, in FIG. 11, components that are identical to those shown in FIG. 7 are given the same reference numbers, and overlapping description thereof is omitted.

In FIG. 11, the data extracting part 201 inputs the previously obtained analysis result into the code storing part 216 as a set of combinable demodulated data when the judgement in Step 329 or Step 331 shown in FIG. 9 is negative, and the code storing part 216 stores the received sets of combinable demodulated data. The code searching part 215 searches pairs of sets of demodulated data that can be judged to have been obtained when scanning the same bar code symbol among the sets of demodulated data stored in the code storing part 216. Pairs of the sets of demodulated data thus obtained are combined by the code combining part 214 and are inputted into the data selecting part 202.

In this case, the sets of composite data combined by the code combining part 214 are inputted into the data selecting part 202 along with the sets of consecutive data extracted by the data extracting part 201. Therefore, there is a high possibility of obtaining effective demodulated data on more bar code symbols from the read signals obtained while the scanning laser beam depicts a scanning pattern as shown in FIG. 6, than in the case of receiving only the set of consecutive data. Therefore, the reading reliability of the bar code scanner can be improved, and as a result, it can be expected that all the bar codes of objects to be read can be read in a shorter time.

Next, a description is given of the case where a plurality of bar code labels on the bar code labels of objects to be read indicate the same bar code symbol.

Figure 12:
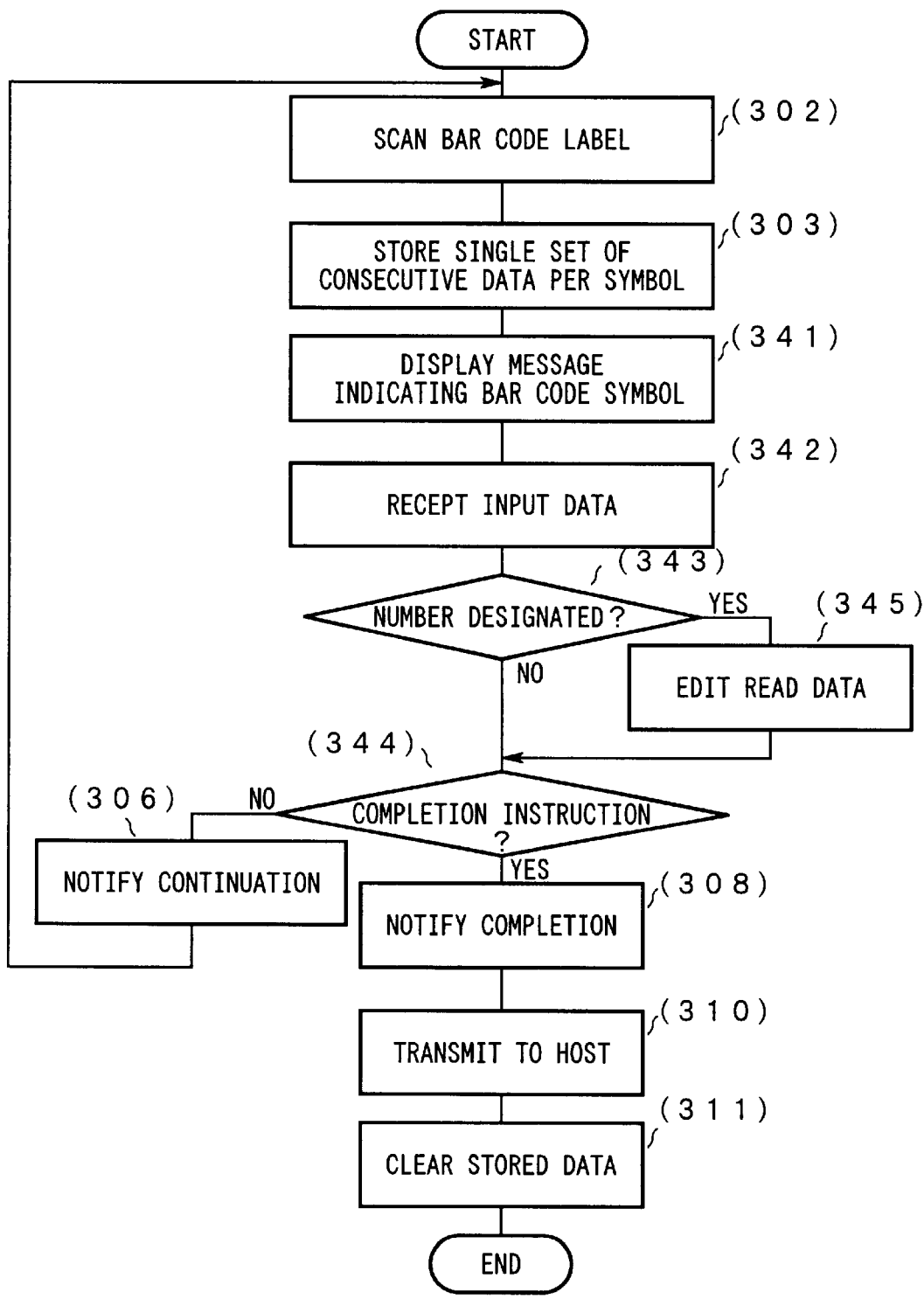
FIG. 12 is a flow chart expressing another operation for collectively reading a plurality of bar code symbols.

FIG. 12 is a flow chart showing an operation for collectively reading a plurality of bar code symbols corresponding to the above case. Also, in FIG. 12, the same reference symbols are given in the steps expressing the same processes as in those in FIG. 8, and overlapping description is omitted.

In this case, after sets of demodulated data that are effective to the data storing part 203 are stored in response to the scanning of the bar code labels (Steps 302 and 303), the demodulation controlling section 205 prepares a message indicating the reading result corresponding to each bar code symbol on the basis of these effective sets of demodulated data. And in line therewith, the input/output controlling part 206 controls the display of a liquid crystal display, wherein the above-described message is displayed by the liquid crystal display (step 341), and the information regarding the bar code symbols that have already been read is provided to an operator.

At this time, the message prepared by the demodulating controlling part 205 may respectively indicate the string of characters itself signified by the effective sets of demodulated data.

Also, based on effective sets of demodulated data stored in the data storing part 203 shown in FIG. 7, the demodulation controlling part 205 makes an inquiry about article information to a POS terminal (not shown) via the interface controlling part 406. Based on the obtained detail, a detailed message including the article information is prepared, by demodulation controlling part 205, as a response to the inquiry, and it is subjected to processing in the input/output controlling part 206.

Thus, by indicating the detailed message including the article information by using a liquid crystal display, this enables the operator to easily judge whether or not all the bar code labels of objects to be read are read, and which article corresponds to the type of bar code label in which there are a plurality of, and enables the operator to easily input instructions.

In particular, as shown in FIG. 13, if a data input unit 211 is installed along with the liquid crystal display on the upper surface that is opposed to the bottom on which the exit window (aperture) is disposed, it is possible to operate the data input unit 211 while checking the data indicated on the liquid crystal display. Therefore, it is possible to easily carry out operations of inputting the judgement result and instruction. Also, the data input unit 211 may be constructed, as shown in, for example, FIG. 13, so that it is provided with a numeric pad for inputting numbers, specifying keys (or scroll arrows) to designate a part of the display messages, and a completion key and a continuation key to notify a judgement result concerning whether or not a reading operation has been completed.

Next, a description is given of an operation for controlling the reading operation in response to the data input from the data input unit 211, taking for example the case where the detail message including the article information is provided as information regarding the bar code symbols that have already been read.

For example, in a case where the type of an article corresponding to any one of the bar code labels of an object to be read is not displayed on the liquid crystal display, it is possible for an operator to easily grasp that the reading operation regarding the corresponding bar code label is not completed.

In this case, the operator operates the above-described continuation key, and the judgement result is inputted which section that the reading operation is not completed (Step 342 in FIG. 12). Since the input data does not signify the number of designated bar code symbols (Negative judgement in Step 343), the demodulation controlling part 205 judges whether or not completion of the reading operation is notified by the input data (Step 344). In this case, since the reading continuation instruction is inputted, the judgement in Step 344 becomes negative. After the operator is notified of that the reading operation is continued (Step 306), and the process shifts to Step 302, wherein a reading process of a new bar code label is carried out.

On the other hand, displaying all the information on articles which are objects to be read on the liquid crystal display, the operator can easily grasp which articles are plural.

In this case, for example, the operator operates the specifying keys (or scroll arrows) and numeric pad, which are equipped in the data input unit 211 shown in FIG. 13, and inputs data signifying the corresponding article and the number thereof (Step 342 in FIG. 12). Upon receiving the input, it is judged that the input is an instruction to designate the number of either one of the bar code labels (The judgement in Step 343 is positive). At this time, the demodulation controlling part 205 instructs an operation to edit the reading result corresponding to the instruction, and accordingly, the data editing part 204 duplicates the data corresponding to the designated article by the designated number, wherein the obtained data are added to the reading result including data corresponding to the other effective sets of demodulated data (Step 345). In addition, in this case, since the input data obtained in Step 342 does not notify completion of the reading operation (The judgement in Step 342 is negative), the process shifts to Step 302 to carry out a reading operation of a new bar code label after the operator is notified of an instruction to continue the reading operation (Step 306).

Thus, the effective sets of demodulated data corresponding to all bar code symbols indicated on bar code label of objects to be read are stored in the data storing part 203, and an adequate number corresponding to the number of articles in a group having adhered or printed bar code labels indicating the same bar code symbol is respectively inputted. Then, the operator inputs the judgement result that the reading operation has been completed (Step 342). At this time, after the demodulation controlling part 205 judges that the completion of the reading operation is notified (The judgement in Step 344 is positive), and the completion of the reading operation is notified to the operator (Step 308), as described above, the reading result edited by the data editing part 204 are transmitted to the host computer (Step 310). Thereafter, the demodulation controlling part 205 clears the effective demodulated data stored in the data storing part 203 (Step 311), and one reading operation is terminated.

Thus, by carrying out the reading operation in compliance with the flow chart shown in FIG. 12, the knowledge that an operator intuitively grasps is effectively utilized, and it is possible to accurately and collectively read a plurality of bar code symbols regardless of whether or not each object to be read are labels indicating different bar code symbols, or is a plurality of bar code labels, where some labels indicate the same bar code symbol.

In particular, by providing an operator with information of every data obtained by read the process in Step 341 shown in FIG. 12, it becomes possible for the operator to intuitively and accurately grasp the progress of an operation for collectively reading bar code labels of objects to be read. Thus, by providing adequate support to the operator, it is possible to quickly and accurately carry out an operation for collectively reading a plurality of bar code labels.

It may be constructed so that a database that stores article information corresponding to the respective bar code symbols is provided in the bar code scanner, and the demodulation controlling part 205 searches adequate article information from the database on the basis of the effective sets of demodulated data stored in the data storing part 203, wherein the demodulation controlling part 205 transmits the information to the input/output controlling part 206.

In addition, the appearance of the bar code scanner shown in FIG. 13 is only one example. The combination and arrangement of respective components and/or items that constitute the data input unit 211 and display unit 212 are not limited to the example shown above, but they may be subjected to various modifications.

Embodiment 3

A description is given of one of the modification examples regarding a method of utilizing the original functions of a bar code scanner as a section for inputting figures, instead of providing the data input unit 211 with a numeric pad described above.

Figure 14:
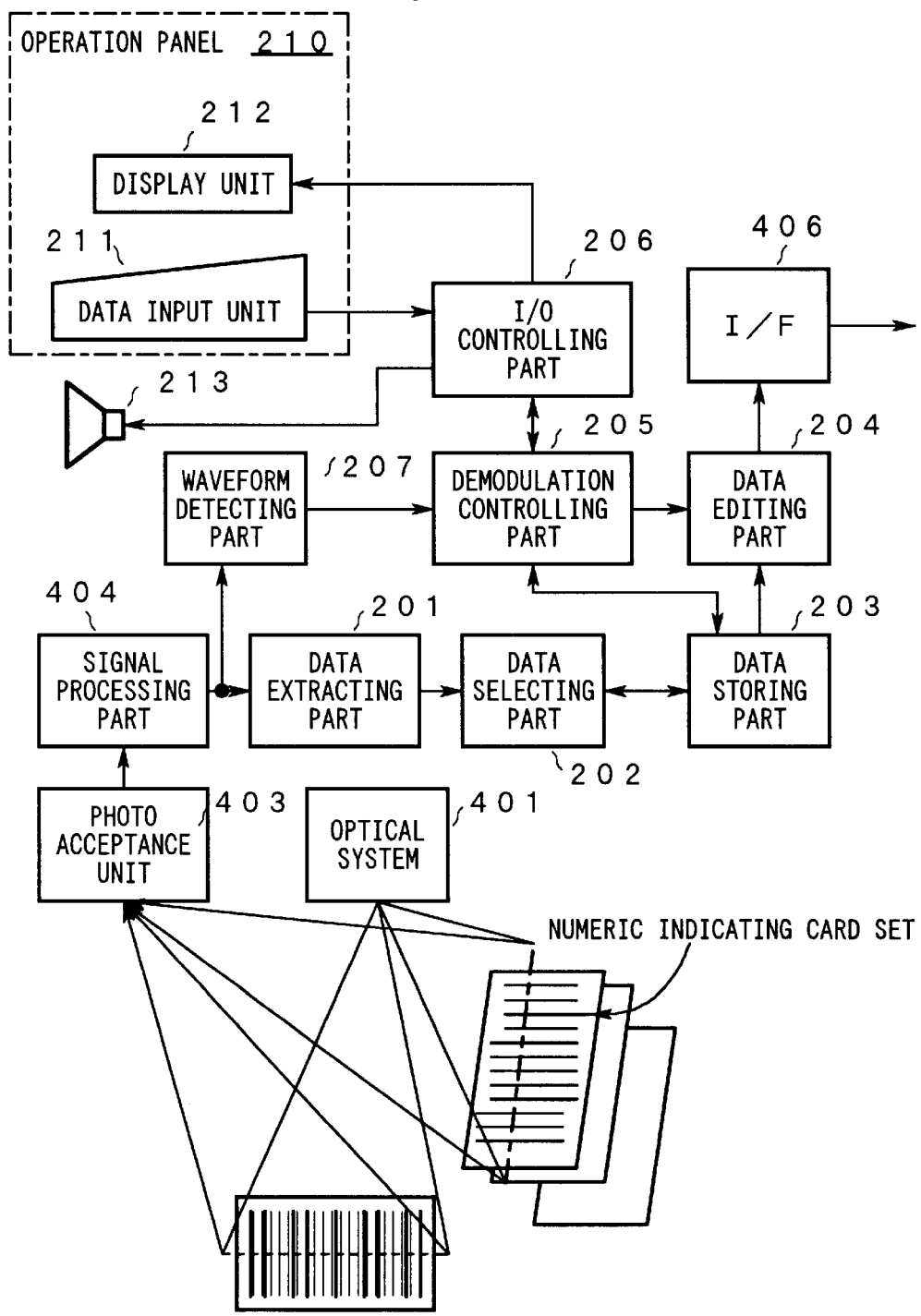
FIG. 14 is a view showing a third embodiment of a bar code scanner according to the invention.

FIG. 14 shows the third embodiment of a bar code scanner according to the invention.

In FIG. 14, the number indicating card set is a set of cards which indicate bar code symbols, respectively signifying any one of the numbers included in an adequate range in compliance with a predetermined format are recorded.

Also, in FIG. 14, the binarized signals obtained by the signal processing part 404 are inputted into the data extracting part 201, and also are inputted in a waveform detecting part 207. When providing the binarized signals including a waveform corresponding to a bar code symbol indicating any one of the above-described numbers, the signal waveform is detected by the waveform detecting part 207, and is converted to the numeric data corresponding thereto. Then, the converted data are inputted into the demodulation controlling part 205.

In this case, by arranging a number indicating card expressing an adequate figure on the reading area of a bar code scanner instead of inputting the number by operating the numeric pad, in Step 301 shown in FIG, 8 and Step 342 shown in FIG. 12, it is possible to input the total number of the bar code labels of an object to be read, or the number corresponding to designated bar code symbol.

In such a modified version, it is possible to reduce the ratio of the area which the data input unit 211 occupies in the operation panel, and instead to equip a liquid crystal display having a large display area in the display unit 212. By this, more detailed information regarding the progress of a reading operation can be provided to an operator or can be provided to an operator in a form that ensures more intuitive and easier understanding. Also, it becomes unnecessary to manually input the number of articles to be designated.

Embodiment 4

However, the data extracting part 201 shown in FIG. 7 inputs binarized signals obtained by the signal processing part 404 as in the demodulating part 405 (Refer to FIG. 19) equipped in a prior art bar code scanner. Therefore, the process made by the data extracting part 201 and the data selecting part 202, and the process made by the demodulating part 405 can be carried out at the same time.

Figure 15:
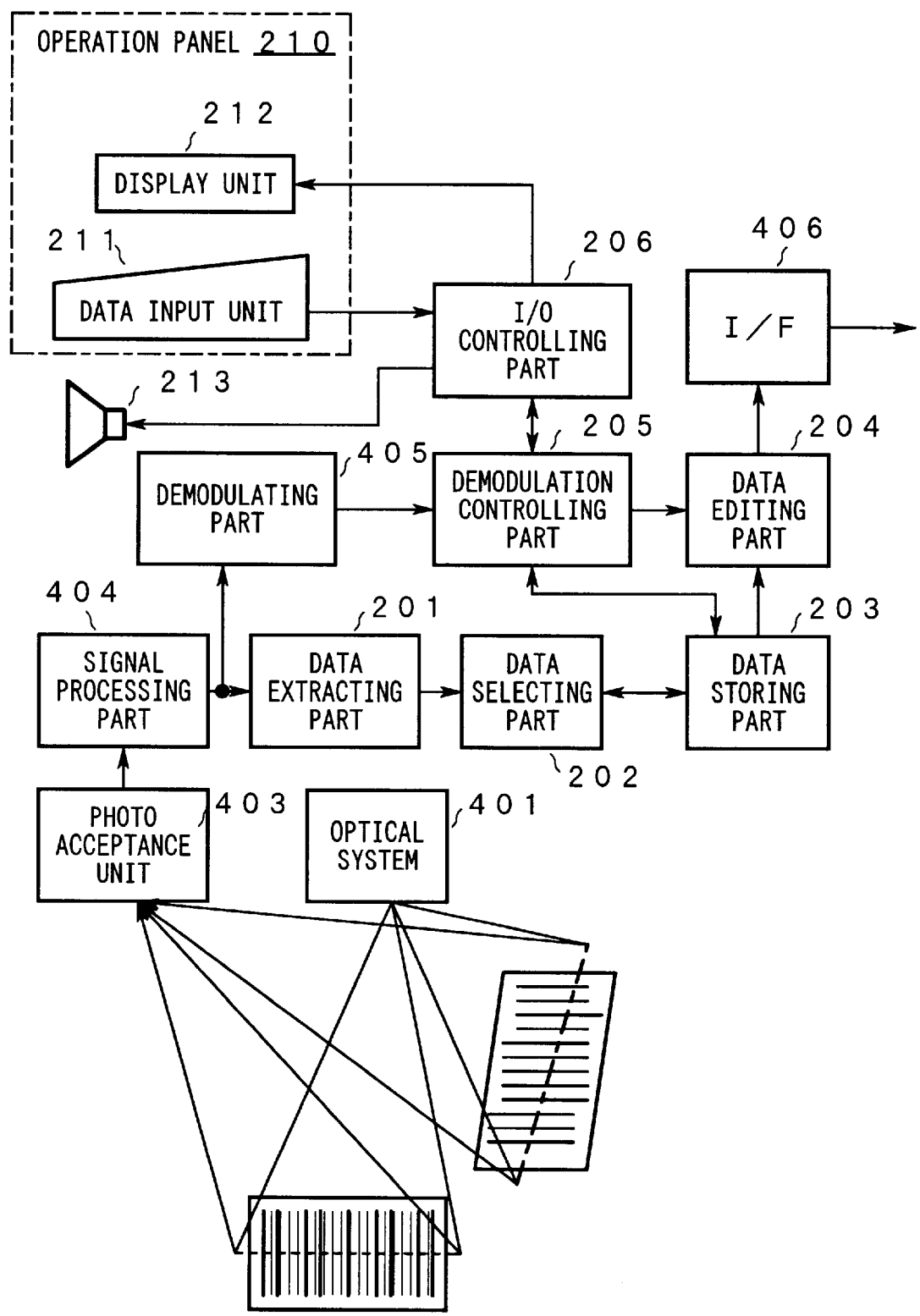
FIG. 15 is a view showing a fourth embodiment of a bar code scanner according to the invention.

FIG. 15 shows the fourth embodiment of a bar code scanner according to the invention.

In FIG. 15, the binarized signal obtained by the signal processing part 404 are inputted into the data extracting part 201 and the demodulating part 405. Based on the binarized signals, the data extracting part 201, data selecting part 202 and data storing part 203 can carry out a process corresponding to an operation for collectively reading a plurality of bar code symbols (Refer to FIG. 8, or FIG. 12 and FIG. 9). At the same time, a process that is similar to that in the prior arts (refer to the clause of "related arts") is carried out by the demodulating part 405 on the assumption that the number of object to be read is single. The reading result obtained by the demodulating part 405 are transferred to the data editing part 204 via the demodulation controlling part 205.

Further, the data input unit 211 is provided with a modal controlling key, and a modal controlling signal, which signifies either one of a single mode to reading result on the assumption that the object to be read is single, or a multiple mode to collectively reading result of a plurality of bar code labels, is inputted in the data input unit 211 in response to the operation of the modal controlling key. Then, the data are transferred to the demodulation controlling part 205 via the input/output controlling part 206.

Where the modal controlling signal signifying the single mode is inputted, the demodulation controlling part 205 transfers the reading result obtained by the demodulating part 405 to the data editing part 204, and at the same time, instructs that the reading result are transferred to the interface controlling part 406 as they are. On the other hand, where a modal controlling signal signifying the multiple mode is inputted, the demodulation controlling part 205 may give the data editing part 204 an instruction to edit reading result based on the effective sets of demodulation data stored in the data storing part 203.

Thus, in the bar code scanner shown in FIG. 15, the input source of sets of demodulated data to be inputted in the data editing part 204 can be changed over by the demodulation controlling part 205 in response to the operation of the modal controlling key.

Therefore, it becomes possible to selectively use the optimal method in response to environments where the bar code scanner is utilized.

For example, where the number of objects to be read is comparatively small, the multiple mode is designated, and the sets of demodulated data stored in the data storing part 203 are inputted in the data editing part 204, whereby it is more efficient to collectively read the plurality of bar code symbols. On the other hand, where there are many objects to be read to such a degree that they cannot be arranged on a checkout counter at the same time, it is difficult to select the operation method as shown in FIG. 6. Therefore, it is reliable and secure to select a single mode and read bar codes one by one as in the prior arts by inputting the demodulating data obtained by the demodulating part 405 into the data editing part 204 in response to the operation to pick up the respective articles one by one.

The bar code scanner shown in FIG. 15 can be applied to both the above-described cases. Therefore, the bar code scanner is applicable in various fields, for example, in not only large-scale retail stores where a single client purchases a number of articles but also small-sized retail stores where a single client purchases a comparatively small number of articles.

Embodiment 5

Next, a description is given of a method for verifying the correctness of the reading result in the case where all the bar code symbols of objects to be read are identical to each other.

Figure 16:
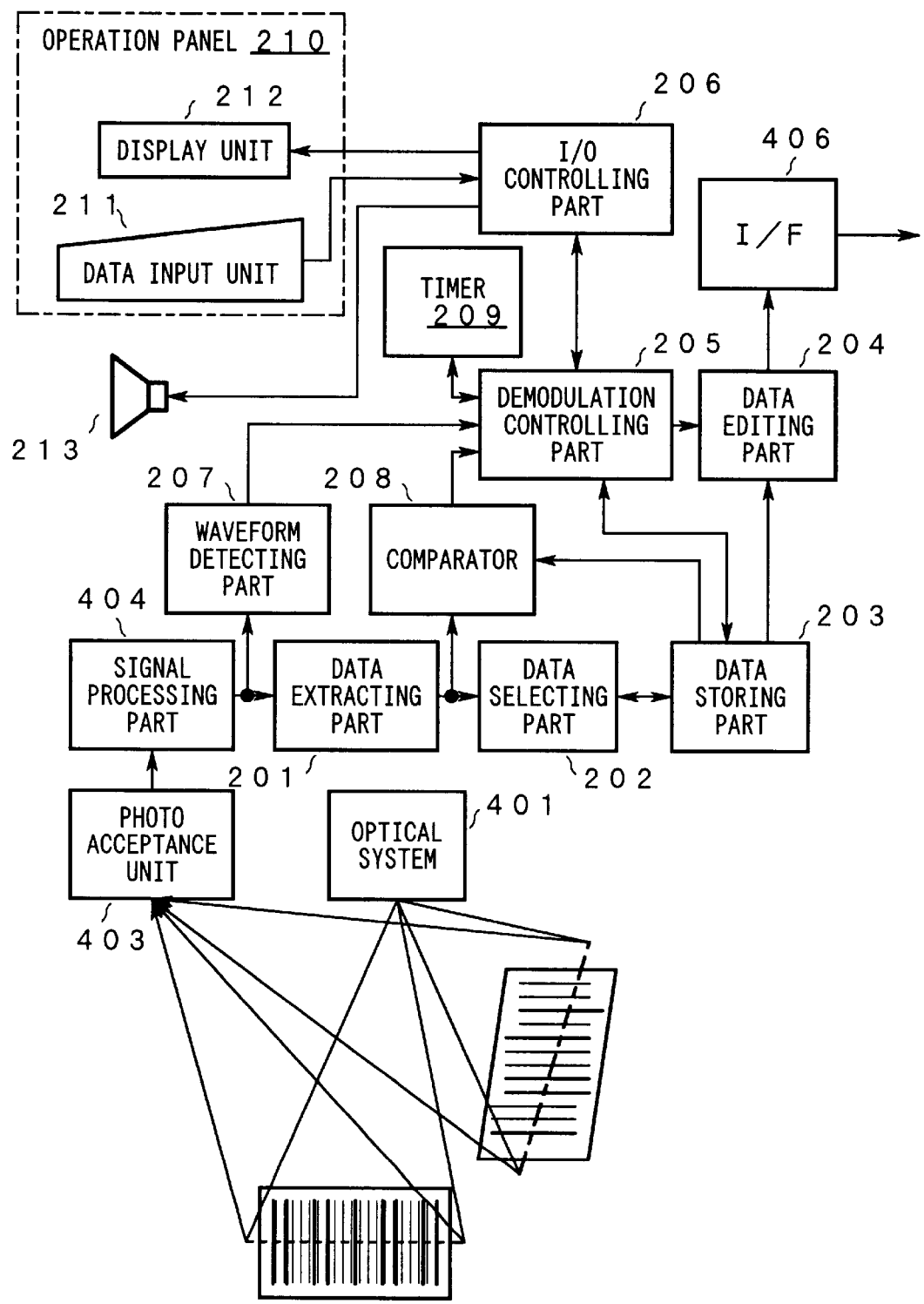
FIG. 16 is a view showing a fifth embodiment of a bar code scanner according to the invention.

FIG. 16 shows the fifth embodiment of a bar code scanner according to the invention. Also, FIG. 17 shows one example of the appearance of the bar code scanner.

The bar code scanner shown in FIG. 16 is further provided with a data comparator 208 and a timer 209 in addition to the components of the bar code scanner shown in FIG. 14.

In the bar code scanner, the sets of consecutive data extracted by the data extracting part 201 are inputted in not only the data selecting part 202 but also the data comparator 208, wherein the data comparator 208 compares the inputted set of consecutive data with every set of consecutive data stored in the data storing part 203. Also, the comparison result of the data comparator 208 is notified to the demodulation controlling part 205.

Also, a predetermined default period is set in the timer 209 shown in FIG. 16, wherein when the time corresponding to the default period elapses, a time-out signal is outputted by the timer 209 and is notified to the demodulation controlling part 205.

Also, the data input unit 211 is provided with a modal controlling key (Refer to FIG. 17), and a modal controlling signal is inputted by the data input unit 211 into the demodulation controlling part 205 via the input/output controlling part 206 in response to the modal controlling key. Whereas, the above modal controlling signal is a signal which points out either one of an identical mode applicable to the case where all the bar code symbols of objects to be read are the same, or a multiple mode in which a plurality of bar code symbols not necessarily all being the same are collectively read. Also, as shown in FIG. 17, the data input unit 211 is provided with a repeat key, and data signifying a predetermined number is inputted in the demodulation controlling part 205 by the data input unit 211 shown in FIG. 16 in response to the operation of the repetition key via the input/output controlling part 206.

On the other hand, a display unit 212 is provided with a set of LEDs (Refer to FIG. 17), wherein the lighting and blinking patterns of the respective LEDs included in the set of LEDs are controlled by the input/output controlling part 206 in response to an instruction from the demodulation controlling part 205.

Next, in the case where the modal controlling signal that designates the identical mode is inputted, a description is given of the comparison result obtained by the data comparator 208 and a method for controlling the reading operation in response to an operation of the above-described repetition key.

Figure 18:
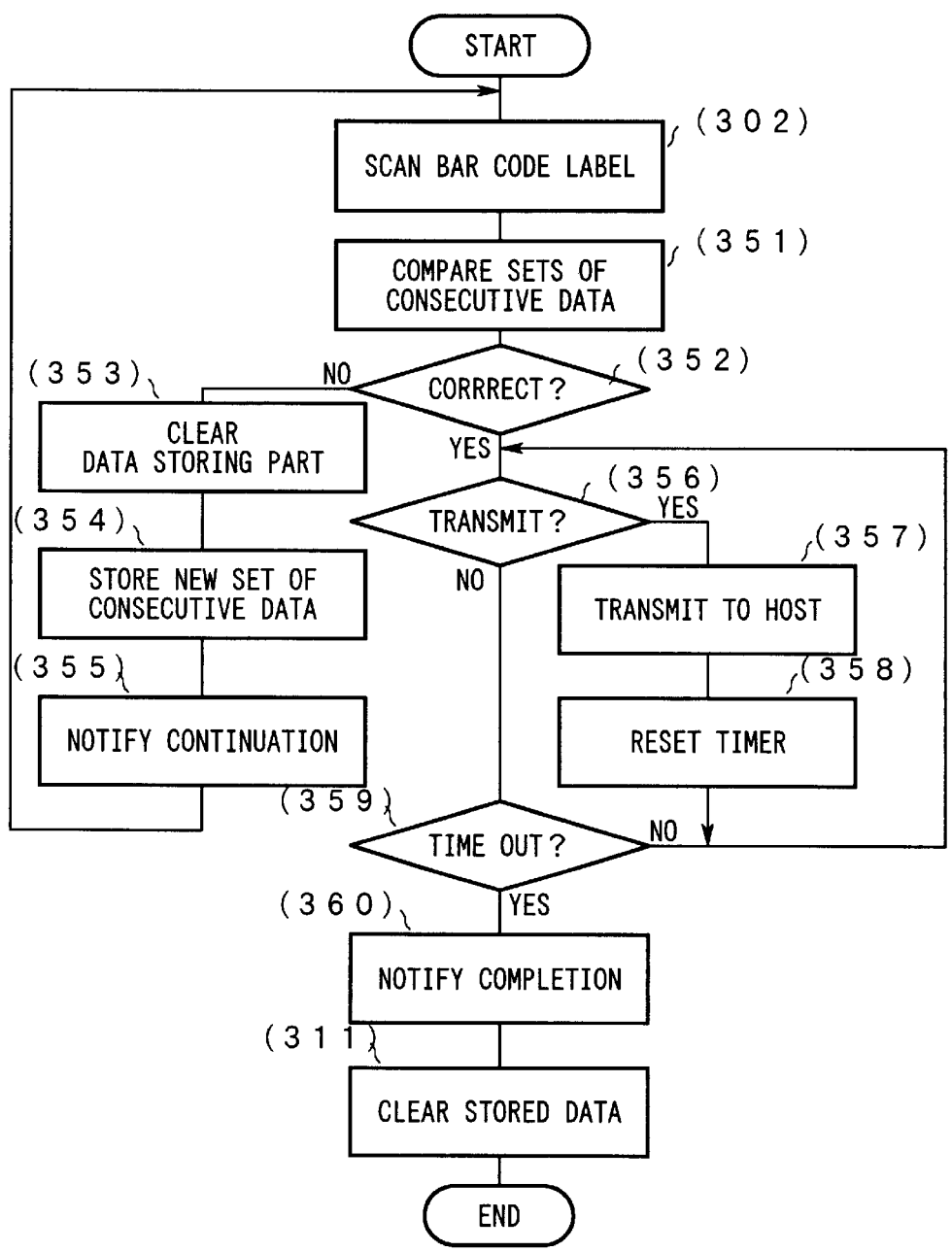
FIG. 18 is a flow chart expressing a reading operation where an identical mode is instructed.

FIG. 18 is a flow chart showing a reading operation where the identical mode is designated.

Herein, in a case where an attempt is made to read the bar code labels adhered or printed onto the packages of a plurality of same articles, all the bar code symbols indicated on all the bar code labels of objects to be read are naturally the same. In that case, when sets of consecutive data corresponding to each bar code symbol are obtained, these sets of consecutive data are automatically the same. Therefore, where all the bar code symbols of the objects to be read are the same, it is possible to judge, on the basis of whether or not the same sets of consecutive data are extracted one after another, whether or not the sets of consecutive data are correct, in other words, whether the bar code symbols of the objects to be read are accurately reflected.

For example, when the set of consecutive data previously stored in the data storing part 203 has been influenced by noise, etc., the data comparator 208 brings about a result of comparison that the set of consecutive data is not identical to the newly extracted set of consecutive data (Step 351) even when the bar code labels adhered or printed onto a plurality of same articles are objects to be read.

In this case, the demodulation controlling part 205 judges that the set of consecutive data stored in the data storing part 203 do not correctly reflect the bar code symbols of the objects to be read, that is, that they are invalid (The judgement in Step 352 is negative), and the set of consecutive data finally extracted after the content of the data storing part 203 is cleared (Step 353) are stored in the data storing part 203 (Step 354). Next, the demodulation controlling part 205 outputs an instruction to light or blink an adequate LED provided in the display unit 212. In line therewith, the adequate LED is driven by the input/output controlling part 206. The process is returned to Step 302 after continuation of a reading operation is notified to an operator by the lighting or blinking of the LED (Step 355), wherein a process is carried out with respect to the newly extracted set of consecutive data.

On the other hand, when the sets of consecutive data corresponding to the same bar code symbols are extracted one after another and are subjected to a comparison by the data comparator 208, the result of comparison signifying that any two sets of consecutive data are identical with each other can naturally be obtained by the data comparator 208 (Step 351). In this case, the demodulation controlling part 205 judges that the set of consecutive data stored in the data storing part 203, to which one of the bar code symbols of the objects to be read are correctly reflected, is valid (The judgement in Step 352 is positive).

Thus, by utilizing the fact that the same sets of consecutive data are repeatedly extracted with respect to any one of the bar code labels that indicate the same bar code symbol, the correctness of the sets of consecutive data is judged, and it is possible to carry out a transmission action described later, in response to the detection of correct set of consecutive data.

After having confirmed the correctness of the set of consecutive data, by having the operator press the repeat key equipped in the data input unit 211 a predetermined number is inputted into the demodulation controlling part 205 via the input/output controlling part 206. Thereby, the demodulation controlling part 205 judges that an instruction to transmit the above-described set of consecutive data has been instructed (The judgement in Step 356 is positive). In this case, the demodulation controlling part 205 provides the data editing part 204 with an instruction to edit the reading result corresponding to the set of consecutive data stored in the data storing part 203. In line therewith, the data editing part 204 edits the reading result, wherein the reading result are transmitted to the host computer via the interface controlling part 406 (Step 357). Next, the timer 209 is reset, having set a default period by the demodulation controlling part 205 (Step 358). Thereafter, the process is returned to Step 356 and waits for a new transmission instruction.

On the other hand, where the judgement in Step 356 is negative, Step 356 and Step 359 are repeated until the timer 209 issues a time-out signal. And, when the time-out is notified (The judgement in Step359 is positive), the demodulation controlling part 205 outputs an instruction to light or blink an adequate LED equipped in the display unit 212, wherein accordingly the adequate LED is driven by the input/output controlling part 206, and completion of the reading operation is notified to the operator by the lighting or blinking thereof (Step 360). After that, the set of consecutive data stored in the data storing part 203 is cleared (Step 311), and the process is terminated.

Thus, whenever the repetition key is pressed by an operator within the time corresponding to the default period of the timer 209, which is established beforehand, the data editing part 204 can repeatedly output the reading result corresponding to the set of consecutive data stored in the data storing part 203 in response to an instruction from the demodulation controlling part 205.

In this case, the number of articles that an operator intuitively grasps is inputted as the number of times at which the repetition key is pressed, and is used to control an action of editing the reading result by the data editing part 204. Since operation to press the repetition key for a number of times equivalent to the number of objects to be read is more intuitive than the operation to input the corresponding number by section of a numeric pad, it can be expected, by employing such a method, that the work load an operator of a bar code scanner is subjected to can be reduced. In particular, where objects to be read are few, it is considered that the advantage of applying an inputting method using the repetition key is great. This is an advantageous factor in small-sized retail stores where the bar code scanner according to the invention are supposed to be arranged.

Because, in such small-sized retail stores, the number of articles which a client usually purchases is generally a few, as a matter of course, the number of objects to be read, which are read by using the identical mode as described above, are few.

On the other hand, where the multiple mode is designated by operating the modal controlling key, the demodulation controlling part 205 controls operations of collectively reading a plurality of bar code symbols as in the flow chart shown in FIG. 8. In this case, it is preferable that an adequate number indicating card is arranged on a checkout counter along with articles to which a bar code label of an object to be read is adhered or printed on. Then, the signal waveform corresponding to the bar code symbol indicated on the number indicating card is detected by the waveform detecting part 207, and the number obtained by the waveform detecting part 207 is transferred to the demodulation controlling part 205. In line therewith, the demodulation controlling part 205 judges whether or not the reading operation is to be continued with the number regarded as the number n of objects to be read instead of the number inputted from the data input unit 211 (Step 301 in FIG. 8). By this, when the objects to be read indicate different bar code symbols, it is possible to collectively read these bar code labels.

However, as shown in FIG. 17, where the data input unit 211 and display unit 212 are constituted of the least number of items, it is impossible to provide an operator with detailed information about the progress of an operation to read a plurality of bar code labels. But, with the construction that does not employ large components such as, for example, a liquid crystal display and a numeric pad, etc., it is possible to downsize the bar code scanner and to reduce the production costs thereof.

Also, as described above, a method in which verification is made by comparing the sets of consecutive data with each other may be applicable to the case of collectively reading a plurality of bar code symbols.

For example, where a flag is provided to respective sets of consecutive data stored in the data storing part 203, and the data comparator 208 compares new set of consecutive data outputted from the data extracting part 201 with the respective sets of consecutive data stored in the data storing part 203, and further the new set of consecutive data is identical to either one of them, the flag corresponding to the set of consecutive data that is equivalent to the new one is set, wherein it is signified that the set of consecutive data are correct. Also, the data editing part 204 edits the reading result on the basis of only the sets of consecutive data for which the corresponding flag is set.

Accordingly, in the multiple mode, it becomes possible to verify the correctness of the extracted sets of consecutive data, wherein only the correct data can be transmitted.

In addition, the respective technologies described above are applicable to an optical code reader that reads optically readable symbols by causing a scanning laser beam to be scanned in a single direction.

The invention is not limited to the above embodiments and various modifications may be made without departing from the spirit and scope of the invention. Any improvement may be made in part or all of the components.

What is claimed is:

1. A scanning apparatus comprising:

an optical system for scanning a laser beam over a predetermined field in a plurality of directions capable of simultaneously scanning a plurality of bar code symbols;

a photo electric converting unit for converting diffusely reflected light into electric signals corresponding to intensity of said reflected light by one or more objects of one or more kinds existing in a scanning field that said laser beam scans with said optical system;

a signal converting unit for converting, to a candidate with a predetermined format, electric signals corresponding to the diffusely reflected light made by at least a part of at least one bar code symbol of a bar code label existing in a scanning field of said laser beam, upon receiving an input of said electric signals;

a discriminating unit for extracting a candidate indicating an entire bar code symbol without any interruption as a set of consecutive data upon receiving a series of candidates obtained by said signal converting unit, the extracting done by excluding fragment data, which is data missing data corresponding to a part of a bar code symbol, from the series of candidates, and the receiving done while the laser beam scans over the predetermined field in a plurality of directions;

a choosing unit for choosing sets of consecutive data that are different from each other from a group of sets of consecutive data extracted by said discriminating unit; and an outputting unit for outputting a reading result including said sets of consecutive data, represented in a predetermined form in response to an input of said sets of consecutive data chosen by said choosing unit.

2. The scanning apparatus according to claim 1, wherein said outputting unit further comprises:

a data inputting unit that inputs data including a number of the bar code labels having same bar code symbols and information indicating the bar code symbol in a group of bar code labels which are objects to be read; and an editing unit that, according to the data inputted by said data inputting unit, duplicates a set of consecutive data corresponding to said bar code symbols included in said group of said sets of consecutive data received from said choosing unit, and edits a reading result including sets of consecutive data corresponding to all the bar code labels included in said group of bar code labels which are the objects to be read.

3. The scanning apparatus according to claim 1, further comprising:
- a data inputting unit for inputting data including a number of the bar code labels having a same bar code symbols and information indicating the bar code symbol in a group of bar code labels which are objects to be read;
- an editing unit that, according to the data inputted by said data inputting unit, duplicates a set of consecutive data corresponding to said bar code symbols included in said group of sets of consecutive data received from said choosing unit, and edits a reading result including sets of consecutive data corresponding to all the bar code labels included in said group of the bar code labels which are the objects to be read;
- a result reporting unit for reporting said reading result edited by said editing unit; and
- a transmission controlling unit for transmitting said reading result in response to an input of an instruction to approve said reading result.

4. The scanning apparatus according to claim 1, further comprising:
- a total number inputting unit for inputting a total number of bar code labels which are objects to be read;
- a judging unit for judging whether or not a reading operation of the bar code labels which are objects to be read is completed, based on the total number inputted by said total number inputting unit and a number of sets of consecutive data chosen by said choosing unit,; and
- an output controlling unit for instructing transfer of the chosen sets of consecutive data to said outputting unit in response to result of the judgement by said judging unit.

5. The scanning apparatus according to claim 1, further comprising:
- a total number inputting unit for inputting a total number of bar code labels which are objects to be read;
- a judging unit for judging whether or not a reading operation of the bar code labels which are objects to be read is completed, based on the total number inputted by said total number inputting unit and a number of sets of consecutive data chosen by said choosing unit; and
- a notifying unit for notifying information to support a reading operation in response to result of the judgement by said judging unit.

6. The scanning apparatus according to claim 1, further comprising a total number inputting unit for inputting a total number of bar code labels which are objects to be read, said total number inputting unit having:
- an operation mechanism for being physically operated to input data indicating the total number; and
- a first generating unit for generating data indicating numerical quantity in response to an operation carried out with said operation mechanism, and inputting said data indicating numerical quantity to said judging unit.

7. The scanning apparatus according to claim 1, further comprising:
- a total number inputting unit for inputting a total number of bar code labels which are objects to be read; and
- a judging unit for judging whether or not a reading operation of the bar code labels which are objects to be read is completed, based on the total number inputted by said total number inputting unit and a number of sets of consecutive data chosen by said choosing unit, wherein said total number inputting unit has:
- a detecting unit for extracting a candidate obtained by said signal converting unit in response to the electric signals corresponding to diffusely reflected light from the bar code label including a bar code symbol indicating a certain number in a predetermined form; and
- a second generating unit for converting data that indicate the numerical quantity according to the candidate extracted by said detecting unit, and inputting data that indicate numerical quantity indicated by the bar code symbol to said judging unit.

8. The scanning apparatus according to claim 1, further comprising:
- a total number inputting unit for inputting a total number of bar code labels which are objects to be read;
- a judging unit for judging whether or not a reading operation of the bar code labels which are objects to be read is completed, based on the total number inputted by said total number inputting unit and a number of sets of consecutive data chosen by said choosing unit; and
- a notifying unit for notifying information to support a reading operation in response to result of the judgement by said judging unit, wherein
  said notifying unit has an indicating unit for indicating a message in response to result of the judgement by said judging unit.

9. The scanning apparatus according to claim 1, further comprising:
- a total number inputting unit for inputting a total number of bar code labels which are objects to be read;
- a judging unit for judging whether or not a reading operation of the bar code labels which are objects to be read is completed, based on the total number inputted by said total number inputting unit and a number of sets of consecutive data chosen by said choosing unit; and
- a notifying unit for notifying information to support a reading operation in response to result of the judgement by said judging unit, said notifying unit having an audio outputting unit for outputting an audio signal in response to result of the judgement by said judging unit.

10. The scanning apparatus according to claim 1, further comprising a reporting unit for reporting, to an operator, information representing meanings of each of said chosen sets of consecutive data, wherein said reporting unit includes:
- a display provided on a hand of the operator;
- an indicating unit displaying information indicating said consecutive data on said display.

11. The scanning apparatus according to claim 1, further comprising:
- a modal inputting unit for inputting a modal instruction to designate a reading mode applicable to a group of bar code lables which is an object to be read;
- a verifying unit that, in response to the input of the modal instruction to designate the reading mode applicable to a case where a plurality of bar code labels having a same bar code symbols are objects to be read, receives a plurality of sets of consecutive data extracted by said discriminating unit and verifies the correctness of said chosen sets of consecutive data chosen according to whether or not these sets of consecutive data are identical to each other; and a transfer controlling unit for controlling an action to transfer said sets of consecutive data chosen by said choosing unit to said outputting unit in response to the verification results from said verifying unit.

12. The scanning apparatus according to claim 1, comprising a modal inputting unit for inputting a modal instruction to designate a reading mode applicable to a group of bar code labels that are objects to be read, wherein said outputting unit comprises:

an output controlling unit for instructing an output of reading result in response to a predetermined operation when a modal instruction to designate a reading mode, applicable to a case where a plurality of bar code labels having the same bar code symbols are objects to be read, is inputted; and a sending unit for outputting reading result corresponding to said sets of consecutive data chosen by said choosing unit, for each output instruction issued.

13. An optical reading apparatus, comprising:

a scanning unit for generating a scanning laser beam to scan optically readable symbols by scanning a laser beam;

a transducer for generating electric signals corresponding to an amount of received light, upon receiving light reflected from said symbols;

a demodulating unit for reproducing sets of data recorded as said symbols by demodulating electric signals outputted by said transducer;

a discriminating unit for extracting sets of data that are different from each other from a group of sets of data reproduced by said demodulating unit;

a numeric inputting unit for receiving an input of numeric data; and a comparing unit for comparing the numeric data inputted by said numeric inputting unit with a number of sets of data extracted by said discriminating unit.

14. The optical reading apparatus according to claim 13, wherein said discriminating unit has a data selecting unit to select a set of data that indicate each said symbol from top to end without any interruption.

15. The optical reading apparatus according to claim 13, further comprising an indicating unit to indicate the sets of data extracted by said discriminating unit.

16. The optical reading apparatus according to claim 13, further comprising an indicating unit to indicate the sets of data extracted by said discriminating unit, wherein said indicating unit has an item selecting unit for selecting at least one of the sets of data extracted by said discriminating unit as an object to be displayed.

17. The optical reading apparatus according to claim 14, further comprising an indicating unit to indicate the sets of data extracted by said discriminating unit, wherein said indicating unit has an item selecting unit for selecting at least one of the sets of data extracted by said discriminating unit as an object to be displayed, and said numeric inputting unit has a reception unit that receives an input regarding a number of articles to which a corresponding symbol is adhered or printed on, corresponding to the set of data selected by said data selecting unit as an object to be displayed.

18. The optical reading apparatus according to claim 13, wherein said numeric inputting unit has an operation mechanism that inputs a predetermined number in response to a single operation.

19. The optical reading apparatus according to claim 13, further comprising a transmitting unit for outputting the sets of data extracted by said discriminating unit to an external device.

20. The optical reading apparatus according to claim 13, further comprising:

a receiving unit for receiving from an external device a detail corresponding to the sets of data obtained by said discriminating unit; and a detail indicating unit for indicating said detail.

21. The optical reading apparatus according to claim 13, further comprising a transmitting unit for outputting the sets of data extracted by said discriminating unit to an external device, wherein said transmitting unit has a transmission controlling unit for controlling the output of sets of data, in response to whether or not the numeric data inputted by the numeric inputting unit are equal to the number of sets of data extracted by the discriminating unit, when compared by the comparing unit.

* * * * *